(12) United States Patent
Park et al.

(10) Patent No.: US 10,739,894 B2
(45) Date of Patent: Aug. 11, 2020

(54) DISPLAY DEVICE

(71) Applicant: Samsung Display Co., Ltd., Yongin-Si, Gyeonggi-Do (KR)

(72) Inventors: Seung Hyun Park, Yongin-si (KR); Duk Sung Kim, Yongin-si (KR); Jun Ho Song, Yongin-si (KR); Jean Ho Song, Yongin-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 16/551,318

(22) Filed: Aug. 26, 2019

(65) Prior Publication Data

US 2019/0384439 A1 Dec. 19, 2019

Related U.S. Application Data

(63) Continuation of application No. 15/402,994, filed on Jan. 10, 2017, now Pat. No. 10,394,356.

(30) Foreign Application Priority Data

Jan. 21, 2016 (KR) .......................... 10-2016-0007729

(51) Int. Cl.
*G06F 3/045* (2006.01)
*G06F 3/041* (2006.01)
*G02F 1/1333* (2006.01)
*G02F 1/1337* (2006.01)
*G02F 1/1343* (2006.01)
(Continued)

(52) U.S. Cl.
CPC .......... *G06F 3/0412* (2013.01); *G02F 1/1368* (2013.01); *G02F 1/13338* (2013.01); *G02F 1/13439* (2013.01); *G02F 1/133345* (2013.01); *G02F 1/133707* (2013.01); *G02F 1/134336* (2013.01); *G02F 1/136286* (2013.01); *G06F 3/044* (2013.01); *G02F 1/134363* (2013.01); *G02F 2001/13606* (2013.01); *G02F 2201/123* (2013.01)

(58) Field of Classification Search
CPC .. G06F 3/0412; G06F 3/044; G02F 1/133345; G02F 1/13338; G02F 1/133707; G02F 1/134336; G02F 1/13439; G02F 1/136286; G02F 1/1368; G02F 1/134363; G02F 2001/13606; G02F 2201/123
See application file for complete search history.

(56) References Cited

U.S. PATENT DOCUMENTS 9,110,546 B2 8/2015 Kim et al.
2013/0162570 A1 6/2013 Shin et al.
(Continued)

FOREIGN PATENT DOCUMENTS

KR 10-1607694 B1 3/2016

*Primary Examiner* — Adam R. Giesy
(74) *Attorney, Agent, or Firm* — Innovation Counsel LLP

(57) ABSTRACT

Provided is a display device including: a first base substrate having a plurality of sensing areas and a plurality of pixel areas each corresponding to a pixel; first electrodes provided in each pixel area on the first base substrate; second electrodes provided in each sensing area to cover at least a portion of the pixel areas; a second base substrate arranged opposite to the first base substrate; and a liquid crystal layer provided between the first base substrate and the second base substrate, wherein each pixel area includes a display area for displaying images and a non-display area provided on at least one side of the display area, and at least a portion of sides of the second electrodes is arranged within the display area.

18 Claims, 19 Drawing Sheets

(51) Int. Cl.
  *G02F 1/1362*  (2006.01)
  *G02F 1/1368*  (2006.01)
  *G06F 3/044*  (2006.01)
  *G02F 1/136*  (2006.01)

(56) References Cited

U.S. PATENT DOCUMENTS

2014/0118299 A1  5/2014  Wang et al.
2015/0355510 A1  12/2015  Kurasawa et al.
2017/0123544 A1  5/2017  Ham et al.

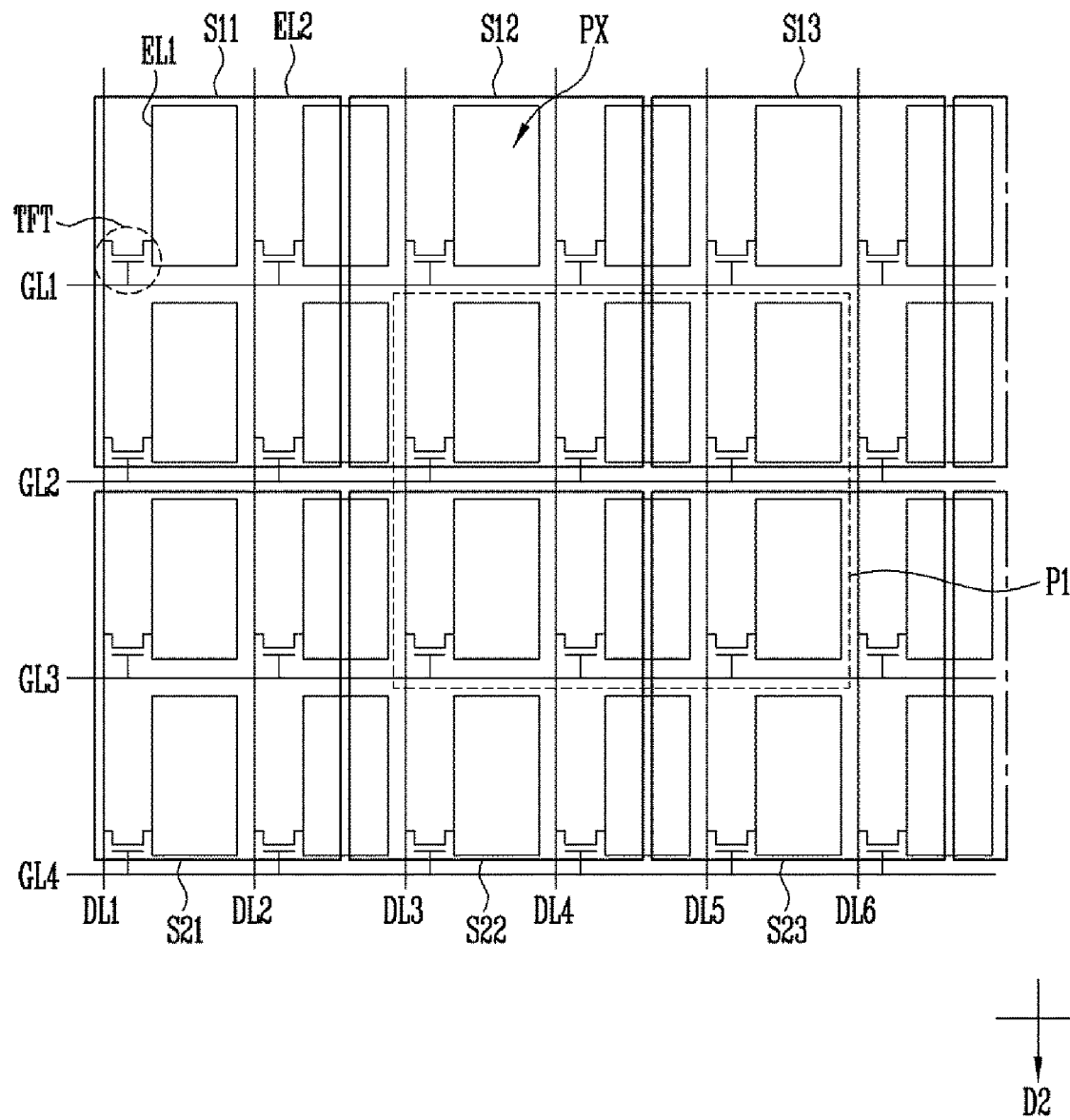

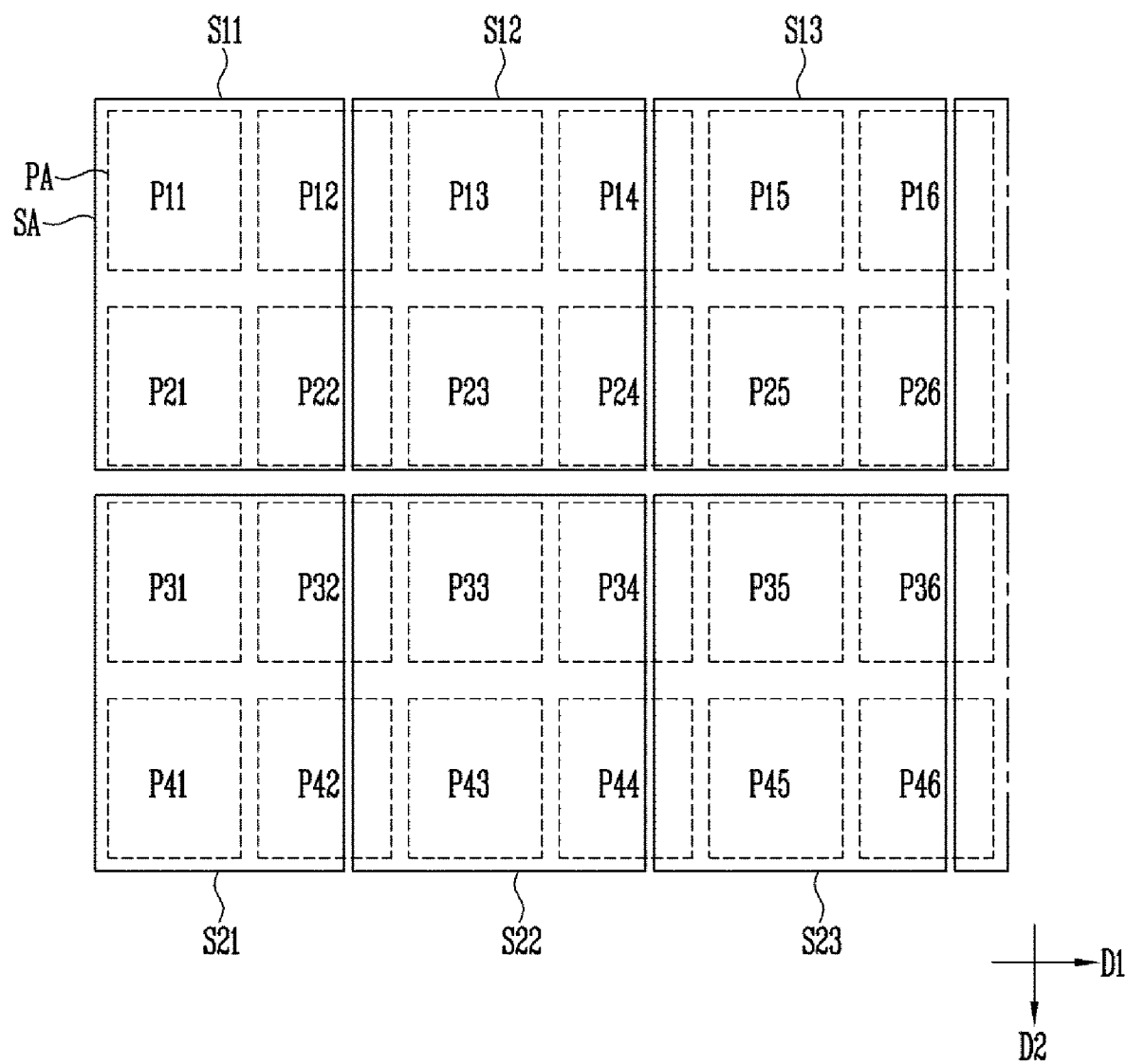

FIG. 10
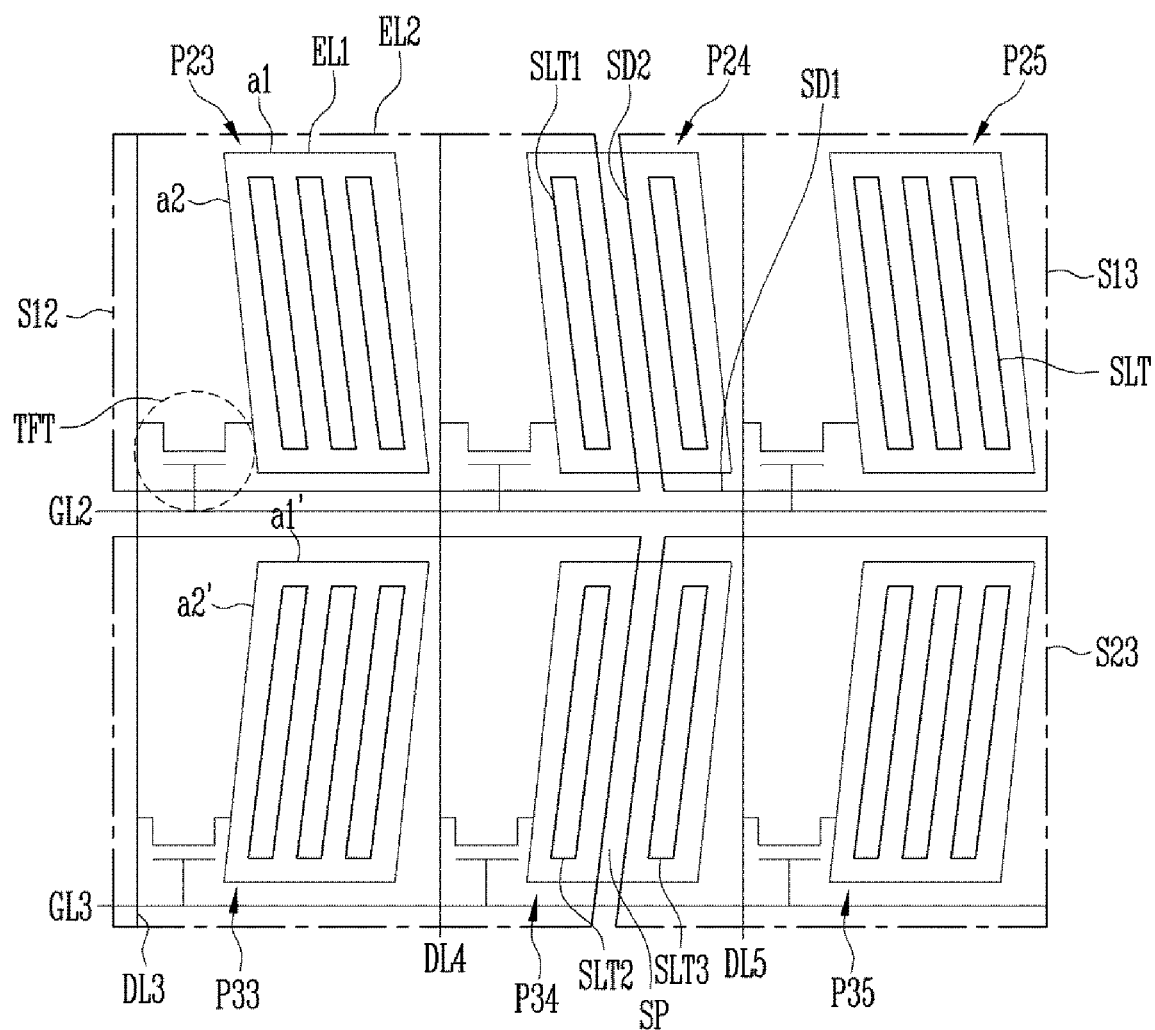
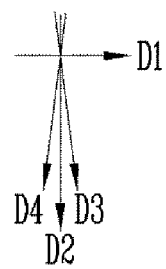

DISPLAY DEVICE

CROSS-REFERENCE TO RELATED APPLICATION

This application is a continuation application of U.S. patent application Ser. No. 15/402,994 filed on Jan. 10, 2017, which claims priority under 35 USC § 119 to Korean Patent Application No. 10-2016-0007729, filed on Jan. 21, 2016, in the Korean Intellectual Property Office, the entire content of which is incorporated herein by reference in its entirety.

BACKGROUND

1. Field

The present disclosure relates to a display device, and more particularly, to a display device that includes an in-cell touch sensor.

2. Description of the Related Art

Touch panel is a type of input device that may be installed inside a display device such as a liquid crystal display, an organic light emitting display device, an electrophoretic display and the like, and that enables users to input information on the screen as they touch the screen with their fingers or a pen and the like while viewing the display device.

As portable terminals such as smart phones, tablet PCs and the like become slimmer in recent days, there is a growing demand for display devices integrated with touch panels, that is, display devices having components of a touch panel embedded inside their panel.

SUMMARY

A purpose of the present disclosure is to provide a display device that includes an in-cell touch sensor to which a capacitive sensing technique of high quality is applied.

According to an embodiment of the present disclosure, a display device includes a first base substrate having a plurality of sensing areas and a plurality of pixel areas each corresponding to a pixel; first electrodes provided in each pixel area on the first base substrate; second electrodes provided in each sensing area to cover at least a portion of the pixel areas; a second base substrate arranged opposite to the first base substrate; and a liquid crystal layer provided between the first base substrate and the second base substrate, wherein each pixel area includes a display area for displaying images and a non-display area provided on at least one side of the display area, and at least a portion of sides of the second electrodes is arranged within the display area.

According to an embodiment of the present disclosure, the pixel may be realized in a display mode for displaying images and in a sensing mode for sensing a touch made by a user, and in the display mode, a common voltage may be applied to the second electrodes, and in the sensing mode, a sensing voltage may be supplied. Herein, the second electrodes may be used as sensing electrodes, and capacitances of the sensing electrodes may be changed by a touch made by a user.

According to an embodiment of the present disclosure, the second electrode may have a plurality of slits within the display area. A portion of sides of the adjacent second electrodes may extend in a direction parallel to the most proximate slit.

According to an embodiment of the present disclosure, when some of the slits have a first width and a portion spaced between sides of the adjacent second electrodes facing each other is referred to as a spaced portion, the spaced portion may have a same width as the first width.

According to an embodiment of the present disclosure, the pixel areas may be arranged in a matrix form in a first direction and in a second direction, the first direction and the second direction crossing each other. The slits may extend in a direction inclined against the first direction.

According to an embodiment of the present disclosure, the slits may be provided in a plural number including first slits extending in a third direction that is inclined against the first direction, and second slits extending in a fourth direction that is also inclined against the first direction but differently from the third direction.

According to an embodiment of the present disclosure, the first slits and the second slits may be alternately arranged in the first direction and/or in the second direction in each pixel area.

According to an embodiment of the present disclosure, the slits may include first slits extending in the third direction that is inclined against the first direction, and second slits each extending from the first slits in the fourth direction that is different from the third direction, and the first slits and the second slits may be arranged in each pixel area.

According to an embodiment of the present disclosure, the second electrodes may be arranged in a matrix form in the first direction and in the second direction, and the second electrodes may be used as sensing electrodes of the touch sensor.

According to an embodiment of the present disclosure, the display device may further include reference voltage lines that are provided on the first base substrate to extend in the first direction or in the second direction, and are connected to the second electrodes.

According to an embodiment of the present disclosure, the second electrodes may be arranged in a zig-zag form along at least one of the first direction and the second direction.

According to an embodiment of the present disclosure, each of the second electrodes may have a polygonal shape such as a rectangle. Otherwise, at least a portion of the sides of the second electrodes may be curved in a plan view.

According to an embodiment of the present disclosure, the display device may further include gate lines that are provided on the first base substrate, and that extend in the first direction; data lines that extend in the second direction; and thin film transistors that are connected to corresponding gate lines and to corresponding data lines, to apply a pixel voltage to the first electrodes.

According to an embodiment of the present disclosure, the second electrode may have first sides extending in the first direction and second sides extending in the second direction, and the first sides may be provided in the non-display area along the extending direction of the gate line.

According to an embodiment of the present disclosure, the display device may further include reference voltage lines that extend in one of the first direction and the second direction, and connected to each of the second electrodes. The reference voltage lines may be provided on the first base substrate and extend in the first direction.

According to an embodiment of the present disclosure, each thin film transistor may include a gate electrode provided on the first base substrate and connected to the corresponding gate line; a semiconductor layer provided on the gate electrode having a first insulating film between the semiconductor layer and the gate electrode; a source electrode provided on the semiconductor layer and connected to the corresponding data line; and a drain electrode provided on the semiconductor layer and arranged opposite to the source electrode. Herein, the first electrodes may be connected to the drain electrodes.

According to an embodiment of the present disclosure, the first electrode may be provided as a one-piece plate, and the second electrodes may overlap the first electrodes having between the second electrodes and the first electrodes a second insulating film provided on the first insulating film.

According to an embodiment of the present disclosure, the second electrodes may contact the reference voltage lines through the first insulating film, and a contact hole provided on the second insulating film.

According to an embodiment of the present disclosure, the second electrodes may include first sensing electrodes extending in the second direction and second sensing electrodes arranged between adjacent first sensing electrodes, and the first sensing electrodes and the second sensing electrodes may be arranged in the first direction alternately. Herein, the display device may further include reference voltage lines that are provided on the first base substrate, that extend in the first direction, and that are connected to the first sensing electrodes.

According to an embodiment of the present disclosure, the display device may be a display device of a PLS mode, or of an IPS mode. In this case, each first electrode may have a plurality of first branches within the display area, each second electrode may have a plurality of second branches within the display area, and the first branches and the second branches may be arranged alternately. Herein, sides of the adjacent second electrodes facing each other may extend in a direction parallel to the most proximate first branch or the second branch.

According to an embodiment of the present disclosure, a display device includes a base substrate having a plurality of pixels arranged in a matrix configuration, each of the plurality of pixels including a pixel electrode; and a plurality of sensing electrodes arranged in a matrix configuration, each of the plurality of sensing electrodes overlapping at least two pixel electrodes; wherein a space between adjacent sensing electrodes is disposed on a display area for displaying images According to an embodiment of the present disclosure, each of the plurality of sensing electrodes may have slits which extend in a first direction, and wherein the space between adjacent sensing electrodes may extend in a direction parallel to the first direction.

According to an embodiment of the present disclosure, the space between adjacent sensing electrodes may be disposed on a center of the pixel electrode.

According to an embodiment of the present disclosure, the space between adjacent sensing electrodes may be the same as a width of the slits.

The display device according to the aforementioned embodiments of the present disclosure avoids arranging edges of the second electrodes near the data lines without using an additional process, thereby preventing parasitic capacitor from occurring near the data lines. Furthermore, the display device prevents light leaks from occurring near the data lines, and thus there is no need to provide a block wire to block the light leaks. Furthermore, since a block wire is not needed in the non-display area provided along the data lines, there is more leeway in modifying the design of the structure of the pixels.

Accordingly, according to the embodiments of the present disclosure, a display device that includes a high quality in-cell touch sensor is provided.

BRIEF DESCRIPTION OF THE DRAWINGS

Example embodiments are described hereinafter with reference to the accompanying drawings. However, the present system and method may be embodied in different forms and are not limited to the embodiments set forth herein. Rather, these embodiments are provided as examples to facilitate the understanding of the present teachings by those of ordinary skill in the art.

In the drawings, the dimensions of the figures may be exaggerated for clarity of illustration. When an element is referred to as being "between" two elements, the element be the only element present between the two elements, or one or more intervening elements may also be present. Like reference numerals refer to like elements throughout.

FIG. 2A is a plane view illustrating a first substrate of the display device, and FIG. 2B is a plane view illustrating a pixel area and a sensing area of FIG. 2A;

FIGS. 10, 11 and 12 are plane views illustrating pixels according to the embodiments of the present disclosure.

DETAILED DESCRIPTION

Figure 1:
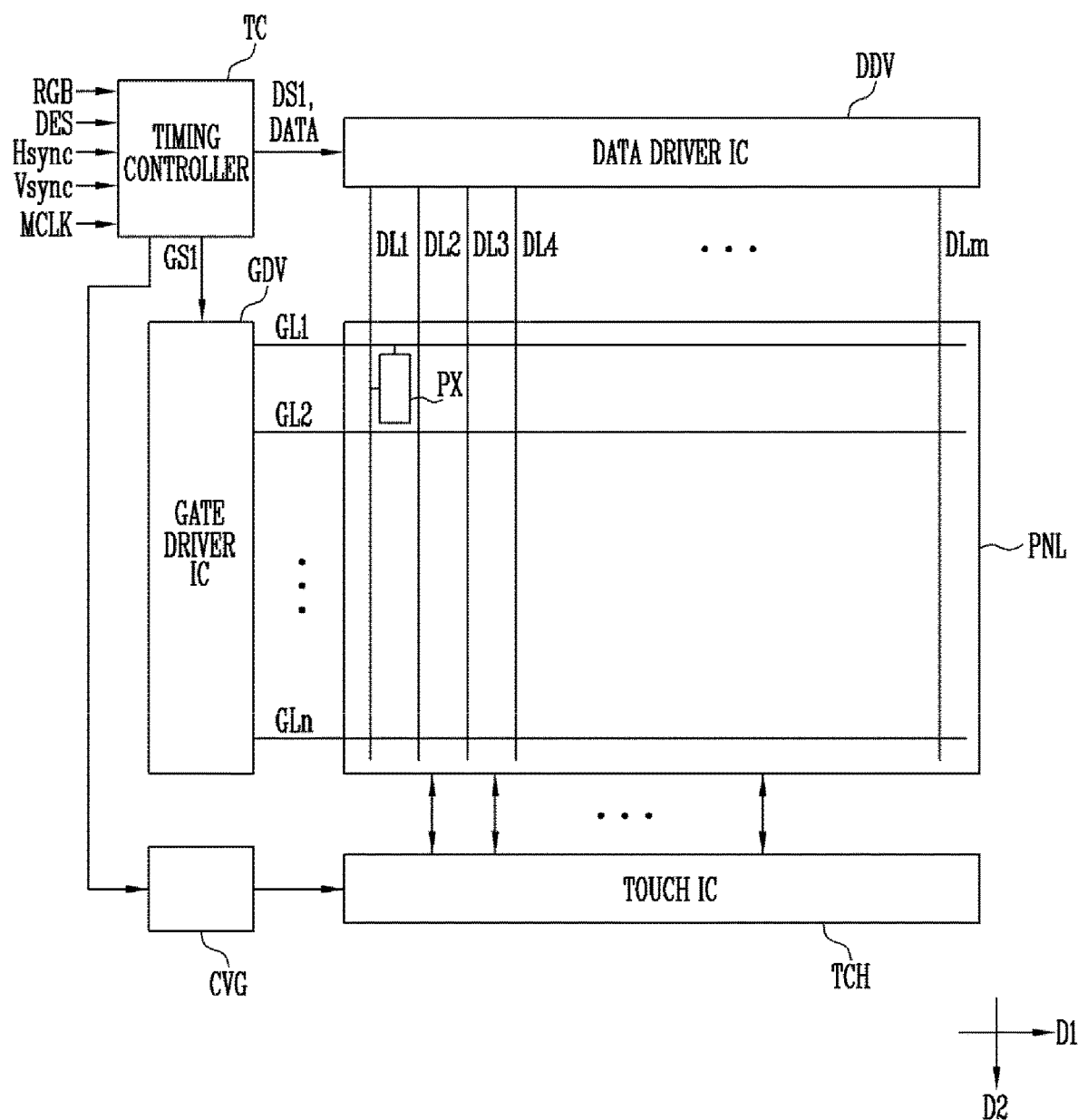
FIG. 1 is a block diagram schematically illustrating a display device according to an embodiment of the present disclosure.

Although only certain embodiments of the present system and method are shown and described herein for purposes of illustration, those of ordinary skill in the art would understand that the described embodiments may be modified in various different ways without departing from the spirit or scope of the present system and method. Accordingly, the drawings and description are illustrative in nature and not restrictive.

Hereinafter, like reference numerals refer to like elements. In the drawings, the thickness or size of layers may be exaggerated for clarity and not necessarily drawn to scale. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present inventive concept. In this specification, a singular form may include a plural form as long as it is not specifically mentioned in a sentence.

Furthermore, 'include/comprise' or 'including/comprising' used in the specification represents that one or more components, steps, operations, and elements exist or are added. In addition, when an element is referred to as being "on" other element, it may be directly on the other element, or it may be indirectly on the other element with one or more intervening elements interposed in between. Further, when a layer is referred to as being "under" another layer, it may be directly under, or one or more intervening layers may also be present. In addition, when a layer is referred to as being "between" two layers, it may be the only layer between the two layers, or one or more intervening layers may also be present. Also, when an element is referred to as being "connected to" another element, it may be directly connected to the other element, or it may be indirectly connected to the other element through one or more intervening elements.

Hereinafter, desirable embodiments of the present disclosure will be explained in more detail with reference to the drawings attached.

FIG. 1 is a block diagram schematically illustrating a display device according to an embodiment of the present disclosure. The display device of the present disclosure is a touch sensor integrated display device.

Referring to FIG. 1, the display device according to the embodiment of the present disclosure includes a display panel PNL, a timing controller TC, a gate driver IC GDV, a data driver IC DDV, a common voltage generator CVG, and a touch IC TCH.

The display panel PNL may be a liquid crystal panel configured to display images and that includes a first substrate, a second substrate, and a liquid crystal layer disposed between the first substrate and the second substrate. The display panel PNL displays images, and includes a touch sensor embedded therein. The touch sensor senses a touch made by a user and the location of the touch. The touch sensor according to the embodiment of the present disclosure is an in-cell touch sensor to which a capacitive sensing technique is applied.

The display panel PNL includes a plurality of gate lines GL1~GLn, n being a natural number, extending in a first direction D1, for example, row direction, and a plurality of data lines DL1~DLm, m being a natural number, extending in a second direction that crosses the first direction D1. The display panel PNL may include a plurality of pixels PX. The plurality of pixels PX may be arranged in the first direction D1 and in the second direction D2.

The timing controller TC receives image data RGB and control signals from an external graphic controller not illustrated. Examples of the control signal include a vertical sync signal Vsync that is a signal for distinguishing frames, a horizontal sync signal that is a signal for distinguishing rows, a data enable signal DES that is at a high level only during a section where data is output to display the section where data is being input, and the main clock signal MCLK.

The timing controller TC converts the image data RGB such that it fits the specifications of the data driver DDV, and outputs the converted image data DATA to the data driver DDV. The timing controller TC generates a gate control signal GS1 and data control signal DS1 in response to the control signal. The timing controller TC outputs the gate control signal GS1 to the gate driver GDV, and outputs the data control signal DS1 to the data driver DDV. The gate control signal GS1 is a signal for driving the gate driver GDV, and the data control signal DS1 is a signal for driving the data driver DDV.

The gate driver GDV generates a gate signal in response to the gate control signal GS1, and outputs the gate signal to the gate lines GL1~GLm. Examples of the gate control signal GS1 include a scan start signal for instructing a start of a scan, at least one clock signal for controlling the output cycle of a gate on voltage, and an output enable signal for limiting the duration time of the gate on voltage.

The data driver DDV generates a grayscale voltage according to the image data DATA in response to the data control signal DS1, and outputs the gradation voltage to the data lines DL1~DLn as a data voltage. Examples of the data voltage include a positive data voltage having a positive value with respect to a common voltage and a negative data voltage having a negative value with respect to the common voltage. Examples of the data control signal DS1 include a horizontal start signal STH for notifying start of transmission of image data DATA to the data driver DDV, a load signal for applying a data voltage to the data lines DL1~DLn, and a reverse signal for reversing the polarity of the data voltage with respect to the common voltage.

The common voltage generator CVG generates a common voltage and a touch scan signal to be applied to the second electrodes that will be explained hereinafter. The display device is a display device integrated with a touch sensor, and thus a frame is temporally divided for driving the display and for driving the touch sensor such that the display device may be driven in a display mode or in a touch mode. When the display device is being driven in the display mode, the second electrodes operate as common electrodes that form an electric field together with pixel electrodes, and when the display device is being driven in the touch mode, the second electrodes operate as sensing electrodes that receive the touch scan signal from the touch IC TCH and sense the location of the touch. In an embodiment of the present disclosure, the common voltage generated in the common voltage generator CVG may be applied to the second electrodes through the touch IC TCH, and in another embodiment of the present disclosure, the common voltage generated in the common voltage generator CVG may be directly applied to the display panel PNL without going through the touch IC TCH.

The touch IC TCH generates a touch scan signal, applies the common voltage or touch scan signal to the second electrodes, and receives a touch sensed signal from the second electrodes. The touch IC TCH identifies whether or not a touch has been made using differences in the touch sensed signals received. For example, when the display device is in a touch mode, a touch scan signal for sensing a touch of the display panel PNL is generated and applied to the second electrodes. The touch scan signal may be a separate touch driving voltage of which the minimum value is greater than the common voltage being applied to the second electrodes to drive the display device. The touch IC TCH senses a difference in capacitance of the touch sensed signals received from the second electrodes to identify whether or not a touch has been made. Herein, the difference in the touch sensed signals received refers to the difference in the touch sensed signals received from the second electrodes connected to adjacent wires.

The timing controller TC, the gate driver GDV, the data driver DDV, the common voltage generator CVG, and the touch IC TCH may each be directly mounted to the display panel PNL in at least one integrated circuit chip, mounted on top of a flexible printed circuit board and attached to the display panel PNL in a tape carrier package TCP, or mounted on top of a separate printed circuit board. Otherwise, at least one of the gate driver GDV and the data driver DDV may be integrated in the display panel PNL together with the gate lines GL1~GLm, the data lines DL1~DLn, and the thin film transistor. Otherwise, the timing controller TC, the gate driver GCV, the data driver DDV, the common voltage generator CVG, and the touch IC TCH may be integrated in a signal chip.

FIG. 2A is a plane view of a first substrate of a display device. In an embodiment of the present disclosure, the display device includes a first substrate, a second substrate, and a liquid crystal layer provided between the first substrate and the second substrate. The first substrate is a panel in which a thin film transistor for driving the liquid crystal layer is provided. The first substrate may be referred to as a thin film transistor panel instead. FIG. 2B is a plane view illustrating a pixel area and a sensing area of FIG. 2A.

Referring to FIGS. 2A and 2B, the thin film transistor substrate according to an embodiment of the present disclosure includes a wire portion provided on a base substrate, and pixels PX connected to the wire portion.

The wire portion provides an image signal to each of the pixels PX, and the wire portion includes n gate lines and m data lines. FIG. 2A illustrates as an example a first gate line GL1 to a fourth gate line GL4 (hereinafter referred to as gate lines GL), a first data line DL1 to a sixth data line DL6 (hereinafter referred to as data lines DL), and pixels connected to the gate lines GL and to the data lines DL.

The gate lines GL extend in a first direction D1, and are sequentially arranged in a second direction D2 that crosses the first direction D1. The gate lines GL transmit scan signals to the thin film transistor TFT.

The data lines DL extend in the second direction D2, and are sequentially arranged in the first direction D1. The data lines DL transmit data signals to the thin film transistor TFT.

What it means by the gate lines GL extending in the first direction D1 is that the gate lines GL overall extend substantially longitudinally along the first direction D1, and thus in some areas the gate lines GL may extend in a direction other than the first direction D1. Likewise, what it means by the data lines DL extending in the second direction D2 is that the data lines DL overall extend substantially longitudinally along the second direction D2, and thus in some areas the data lines DL may extend in a direction other than the second direction D2.

One or more pixels PX may be provided in each of pixel areas arranged in a matrix form. Herein, explanation will be based on an exemplary embodiment where one pixel PX corresponds to one pixel area PA.

Each pixel PX includes a thin film transistor TFT connected to the wire portion, a first electrode EL1 connected to the thin film transistor TFT, and a second electrode EL2 that forms an electric field together with the first electrode ELL A gate electrode of the thin film transistor TFT is connected to a corresponding gate line GL among the gate lines GL, and a source electrode of the thin film transistor TFT is connected to a corresponding data line DL among the data lines DL. A drain electrode of the thin film transistor TFT is connected to the first electrode ELL In an embodiment of the present disclosure, one pixel includes one thin film transistor, and this thin film transistor is connected to one gate line and to one data line, but the inventive concept is not limited thereto. For example, two data lines and one gate line may be connected to one pixel, or one data line and two gate lines may be connected to one pixel. Otherwise, one pixel may include a plurality of thin film transistors, in which case each thin film transistor may be connected to its corresponding data line and to its corresponding gate line.

The first electrode EL1 is provided inside each pixel area PA. The first electrode EL1 has an overall rectangular shape in a plan view, but the inventive concept is not limited thereto. That is, the shape of the first electrode EL1 may vary depending on the shape of each pixel PX.

The second electrode EL2 covers at least a portion of the first electrode EL1 within each pixel area PA, and accordingly, the second electrode EL2 overlaps the at least a portion of the first electrode EL1 in a plan view. The second electrode EL2 has a rectangular shape overall in a plan view, but the inventive concept is not limited thereto. That is, the shape of the second electrode EL2 may vary depending on embodiments.

In an embodiment of the present disclosure, the second electrode EL2 is used as a common electrode that forms an electric field together with the first electrode EL1 and also as a sensing electrode that senses a touch made by the user. When the second electrode EL2 is being used as a sensing electrode, it is provided in the plural. Herein, when referring to a sensing area SA as a unit area for identifying the location of a touch made by the user while sensing the touch, each of the plurality of sensing electrodes is provided inside each sensing area SA.

Hereinafter, explanation will be made on a relationship between pixel areas PA and sensing areas SA with reference to FIG. 2B. As illustrated in FIG. 2B, on a base substrate, pixel areas PA are provided in the form of a matrix. N pixel areas PA are provided along a row, and m pixel areas PA are provided along a column. The pixel areas PA are areas for providing pixels PX for displaying images.

Sensing areas SA are also arranged on the base substrate in the form of a matrix. The sensing areas SA are areas for providing sensing electrodes for sensing a touch made by the user. The sensing areas are provided in a number of p, p being a natural number, along a row, and in a number of q, q being a natural number, along a column. In an embodiment of the present disclosure, one sensing area SA may be greater than one pixel area PA. For example, one sensing area S22 may cover a portion of P32, a portion of P42, an entirety of P33, an entirety of P43, a portion of P34, and a portion of P44.

The second electrode EL2 may be provided in each sensing area SA in a size corresponding to the sensing area SA For example, the second electrode EL2 that corresponds to the S22 may cover a portion of P32, a portion of P42, an entirety of P33, an entirety of P43, a portion of P34, and a portion of P44.

As aforementioned, the size of each sensing area SA is the same or greater than the size of each pixel PA, and thus the number of the sensing areas SA may be the same or smaller than the number of the pixel areas PA. That is, p may be the same or smaller than n, and q may be the same or smaller than m.

In the case where each sensing area SA covers two or more pixel areas PA, the second electrode EL2 may be formed in an integrated form and not be separated in that covered area. That is, one second electrode EL2 may cover two or more first electrodes EL1, and the pixels PX corresponding to the two or more first electrodes EL1 share the second electrode EL2.

Figure 3A:
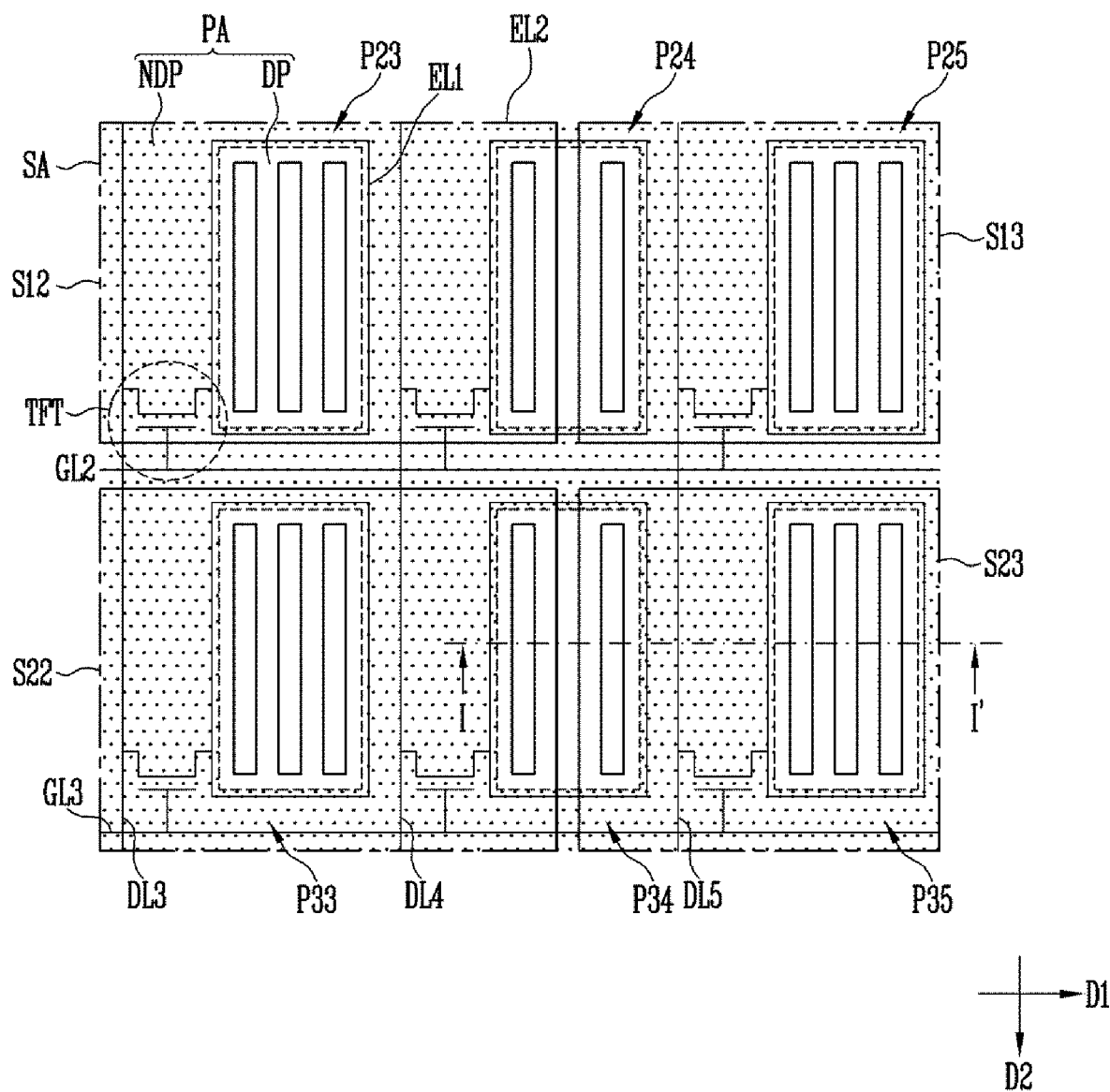
FIG. 3A and FIG. 3B are plane views illustrating area P1 in FIG. 2.
Figure 3B:
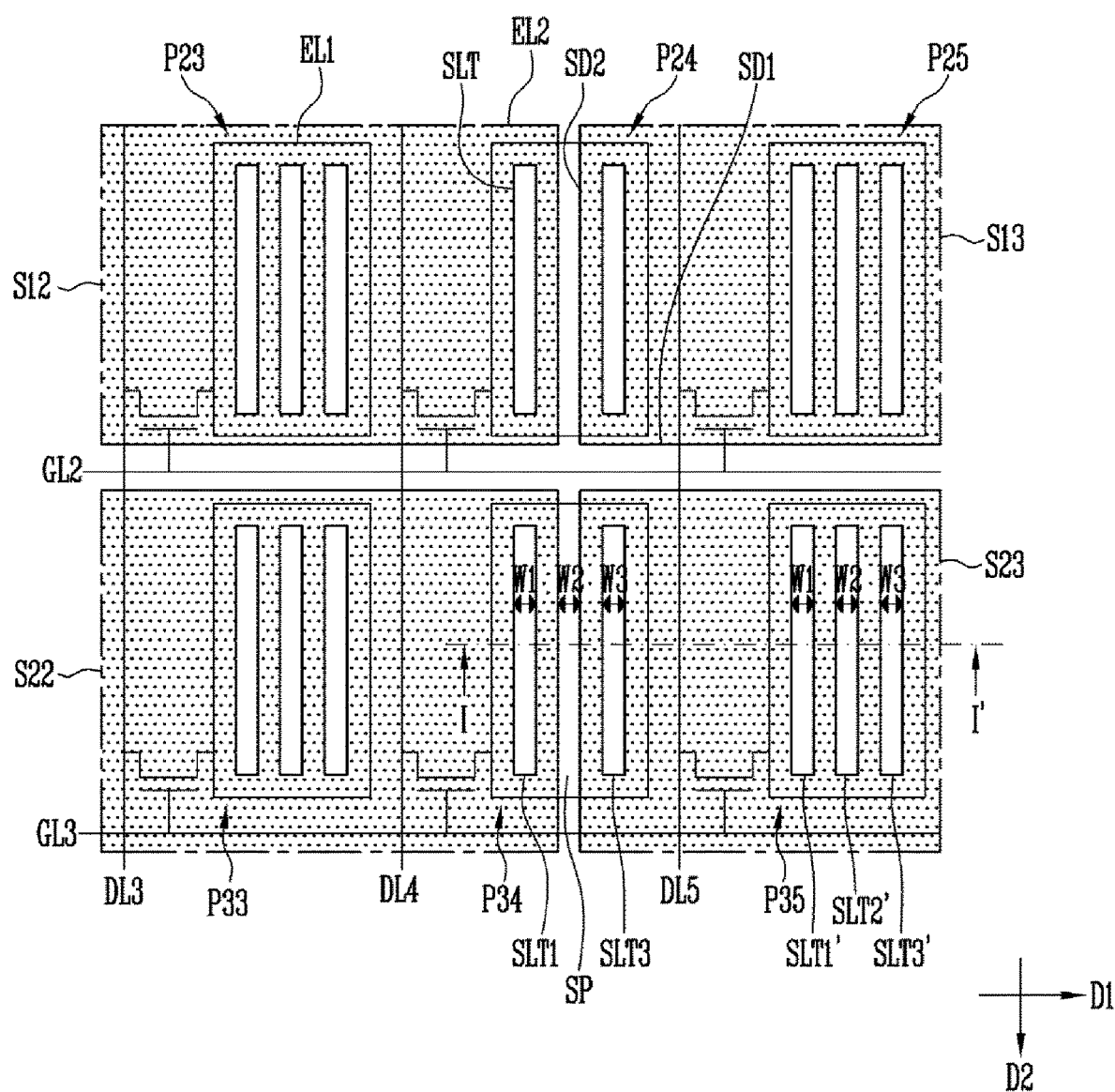
Figure 3C:
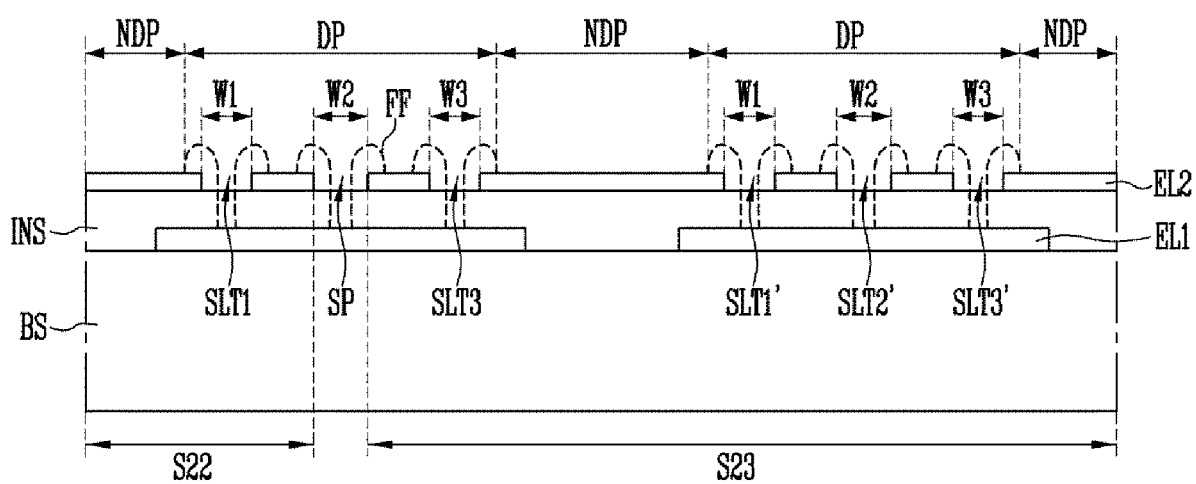
FIG. 3C is a cross-sectional view along line I-I' in FIG. 3A and FIG. 3B.

FIG. 3A and FIG. 3B are plane views illustrating the portion corresponding P1 of FIG. 2, and FIG. 3C is a cross-sectional view of FIG. 3A and FIG. B along line I-I'.

Hereinafter, explanation will be made on a thin film transistor TFT substrate according to an embodiment of the present disclosure referring to FIGS. 3A to 3C. Herein, for the sake of ease of explanation, FIG. 3C illustrates only a base substrate BS, a first electrode EL1, an insulating film INS, and a second electrode EL2, while omitting a thin film transistor TFT.

Each pixel area PA includes a display area DP for displaying images, and a non-display area NDP provided on at least one side of the display area DP and that does not display images. In an embodiment of the present disclosure, the non-display area NDP surrounds the display area DP. In FIG. 3A, the non-display area NDP is represented by halftone dots.

The display area DP corresponds to an area where the first electrode EL1 and the second electrode EL2 form an electric field in each pixel. In an embodiment of the present disclosure, the display area DP may substantially correspond to an area where the first electrode EL1 is formed and the display area DP may be formed to be smaller than the area where the first electrode EL1 is formed. However, there is no limitation to the size area of the display area DP. That is, the size area of the display area DP may be substantially the same as the area where the first electrode EL1 is formed.

The first electrode EL1 is provided as a one-piece plate that is not separated and that does not have a slit or a bump.

The second electrode EL2 has a plurality of slits SLT in which a portion of the second electrode EL2 removed. The slits SLT may be formed inside the second electrode EL2. In FIG. 3B, the second electrode EL2 is represented by halftone dots.

In an embodiment of the present disclosure, the slits SLT may extend longitudinally along the second direction D2, and may have a predetermined width in the first direction D1. In each pixel, the slits SLT may have substantially the same width, but the inventive concept is not limited thereto, and thus the shapes of the slits may vary as long as they can form an electric field capable of driving liquid crystal molecules in the relationship with the first electrode EL1. For example, the width of the slits SLT may sequentially decrease or increase along the first direction D1 and/or the second direction D2. Otherwise, the width of the slits SLT may increase and then decrease along the first direction D1 and/or the second direction D2, or decrease and then increase along the first direction D1 and/or the second direction D2.

Both longitudinal ends of the slits SLT may be located within the display area DP, but the inventive concept is not limited thereto. For example, the slits SLT may extend up to the non-display area NDP, in which case at least some of the slits SLT may be located within the non-display area NDP.

The slits SLT may be provided in various counts. FIG. 3A and FIG. 3B illustrate an example where two to three slits SLT are formed in each pixel area, but the inventive concept is not limited thereto. That is, more slits SLT may be provided in each pixel area. The number of the slits SLT may vary as long as they form an electric field in the relationship with the first electrode EL1.

In an embodiment of the present disclosure, the second electrodes EL2 are provided in rectangular shapes that include one pair of first sides SD1 parallel to each other, and one pair of second sides SD2 that extend in the direction of the one pair of first sides SD1. The first sides SD1 may extend in the first direction D1, and the second sides SD2 may extend in the second direction D2.

The first sides SD1 may be substantially parallel to the extension direction of the gate lines GL. The first sides SD1 may be provided in the non-display area between the gate lines GL adjacent to each other.

The second sides SD2 may be substantially parallel to the extension direction of the data lines DL. The second sides SD2 are provided between the data lines DL adjacent to each other such that they transverse the display area DP. That is, at least a portion of the second sides SD2 may be arranged in the display area DP.

In the present disclosure, the second sides SD2 of the second electrodes EL2 may extend in a direction parallel to the most proximate slit SLT. For example, in the second electrode EL2 formed in sensing area S12 and the second electrode EL2 formed in sensing area S13, the sides facing each other extend in a direction parallel to the most proximate slit SLT.

Herein, a spaced portion SP between the sides of the second electrodes EL2 facing each other may be provided in a region corresponding to one of the slits SLT in the pixels where the sides of the second electrode EL2 are not provided. For example, pixel area P34 where the sides of the second electrode EL2 facing each other are provided has a first slit SLT1, a spaced portion SP, and a third slit SLT3 in the first direction D1 sequentially, and pixel area P35 where the sides of the second electrodes EL2 facing each other are provided may have a first slit SLT1', a second slit SLT2' and a third slit SLT3' in the first direction D1 sequentially. The first slit SLT1, the spaced portion SP, and the third slit SLT3 of pixel area P34 each corresponds to the first slit SLT1', the second slit SLT2', and the third slit SLT3' of pixel area P35, respectively. That is, the spaced portion SP corresponds to the second slit SLT2' of pixel area P35. Accordingly, when assuming that the first slit SLT1, the spaced portion SP, and the third slit SLT2 of pixel area P34 has a first width W1, a second width W2, and a third width W3, respectively, the first slit SLT1', the second slit SLT1', and the third slit SLT1' of pixel area P35 may also have the first width W1, the second width W2, and the third width W3, respectively.

Furthermore, in another embodiment, the slits SLT and the spaced portion SP may all have the same width, but the inventive concept is not limited thereto. That is, their widths may vary as long as they form an electric field in the relationship with the first electrode ELL.

In the aforementioned embodiment, at least a portion of the spaced portion SP of the second electrodes EL2 is provided in the display area DP, and the first sides SD1 are provided in the non-display area between the gate lines GL adjacent to each other, but the inventive concept is not limited thereto. For example, although not illustrated, in another embodiment of the present disclosure, the slits may extend in a direction different from the second direction, for example in a direction parallel to the first direction. In such a case where the slits in the second electrode extend not in the second direction but in the first direction, the space between the first sides of the second electrode facing each other becomes the spaced portion. The spaced portion extends in the first direction, and at least a portion of the spaced portion is arranged inside the display area. The second sides of the second electrodes may extend in the second direction in which case the second sides are provided in the portion in the second direction excluding the display area, that is, on the non-display area.

As aforementioned, since the first electrode EL1 may be provided as a one-piece plate, and the second electrode EL2 may be provided to have a plurality of slits SLT, the display apparatus may be driven in a PLS (plane-to-line switching) mode. However, there is no limitation to the shape or driving mode of the first electrode EL1 and the second electrode EL2.

For example, in each pixel, a plurality of slits may be formed in the first electrode as well. When the slits are formed, the portion excluding the slits is provided in the shape of a branch. When referring to the portion provided in the shape of a branch as a branch unit, a plurality of branch units may be formed in the first electrode. Furthermore, a plurality of branch units may be formed in the second electrode in the same manner. Herein, the branch units of the first electrode and the branch units of the second electrode may be arranged on a plane alternately, in which case the operation may be made in an IPS (In Plane Switching) mode. The structure of the display device may of course be driven in a mode other than the PLS mode or the IPS mode as long as it is within the concept of the present disclosure.

Figure 4:
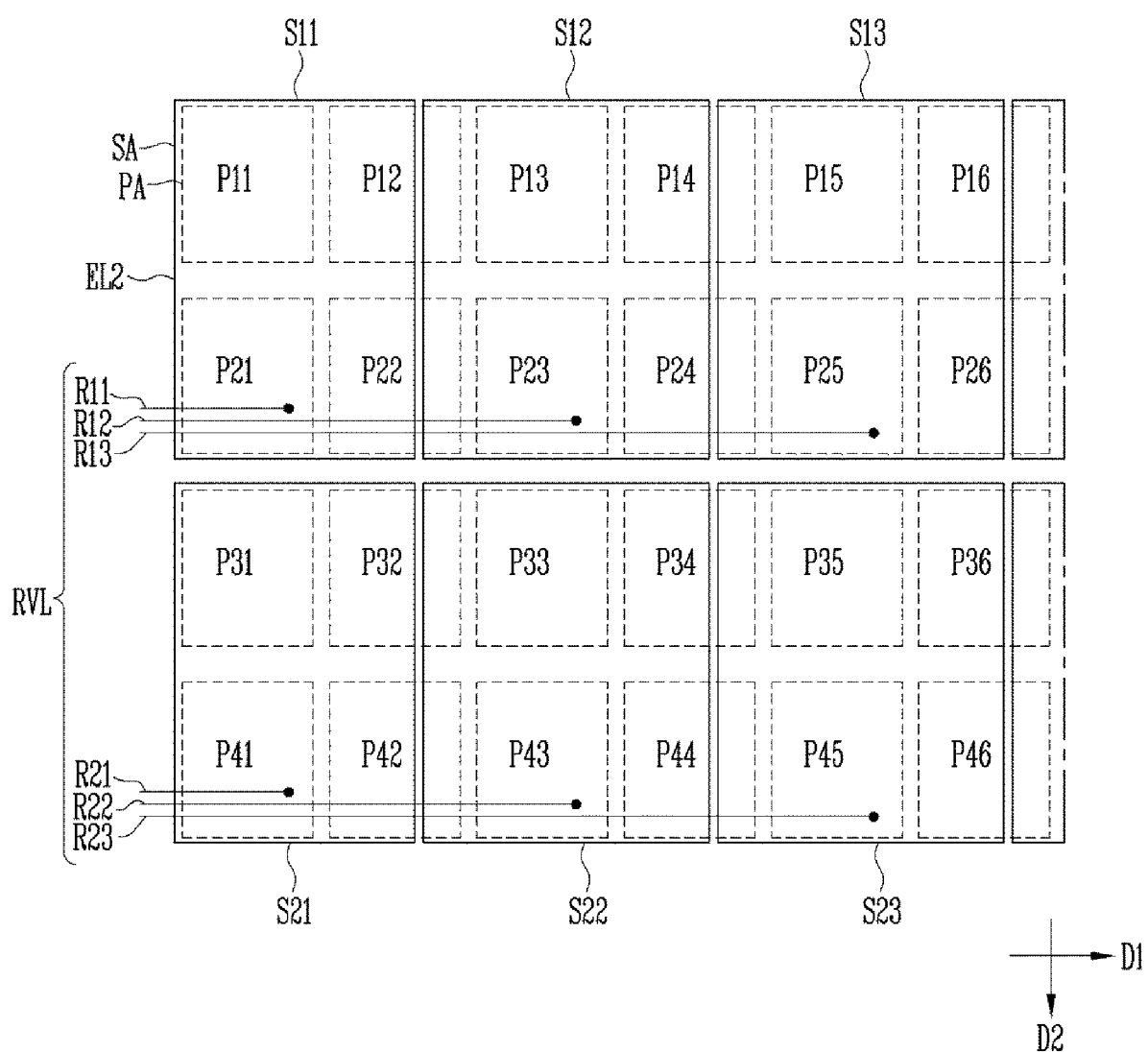
FIG. 4 is a plane view illustrating second electrodes of FIG. 2.

FIG. 4 is a plane view of the second electrodes of FIG. 2. FIG. 4 illustrates the connection relationship of wires in the case where the second electrodes are used as sensing electrodes. Herein, the second electrodes are illustrated to be formed in each sensing area in the same size as the sensing areas.

Referring to FIG. 4, the second electrodes EL2 disposed in areas corresponding to the sensing areas S11, S12, S13, S21, S22 and S23 may be used as sensing electrodes of a self-capacitive touch sensor.

In an embodiment of the present disclosure, the second electrodes EL2 are provided in each of the sensing areas SA. To each second electrode EL2, a reference voltage line RVL is connected which connects the second electrodes EL2 to the touch IC TCH, see FIG. 1. One reference voltage line RVL is provided in each sensing area SA. For example, to the second electrode EL2 provided in sensing area S11, reference voltage line R11 is connected, and to the second electrode EL2 provided in sensing area S12, reference voltage line R12 is connected, and to the second electrode EL2 provided in sensing area S13, reference voltage line R13 is connected. In the same manner, to the second electrode EL2 provided in the sensing area S21, reference voltage line R21 is connected, and to the second electrode EL2 provided in sensing area S22, reference voltage line R22 is connected, and to the second electrode EL2 provided in sensing area R23, reference voltage line R23 is connected.

The reference voltage lines RVL may extend in the first direction D1. When the second electrodes EL2 are in a display mode, the second electrodes EL2 receive a common voltage from the common voltage generator CVG; see FIG. 1, and when the second electrodes EL2 are in a touch mode, the second electrodes EL2 receive a touch scan signal from the touch IC TCH, and provides the touch sense signal to the touch IC TCH. Accordingly, it is possible to obtain whether or not a touch has been made by the user, and the location of the touch.

Figure 5A:
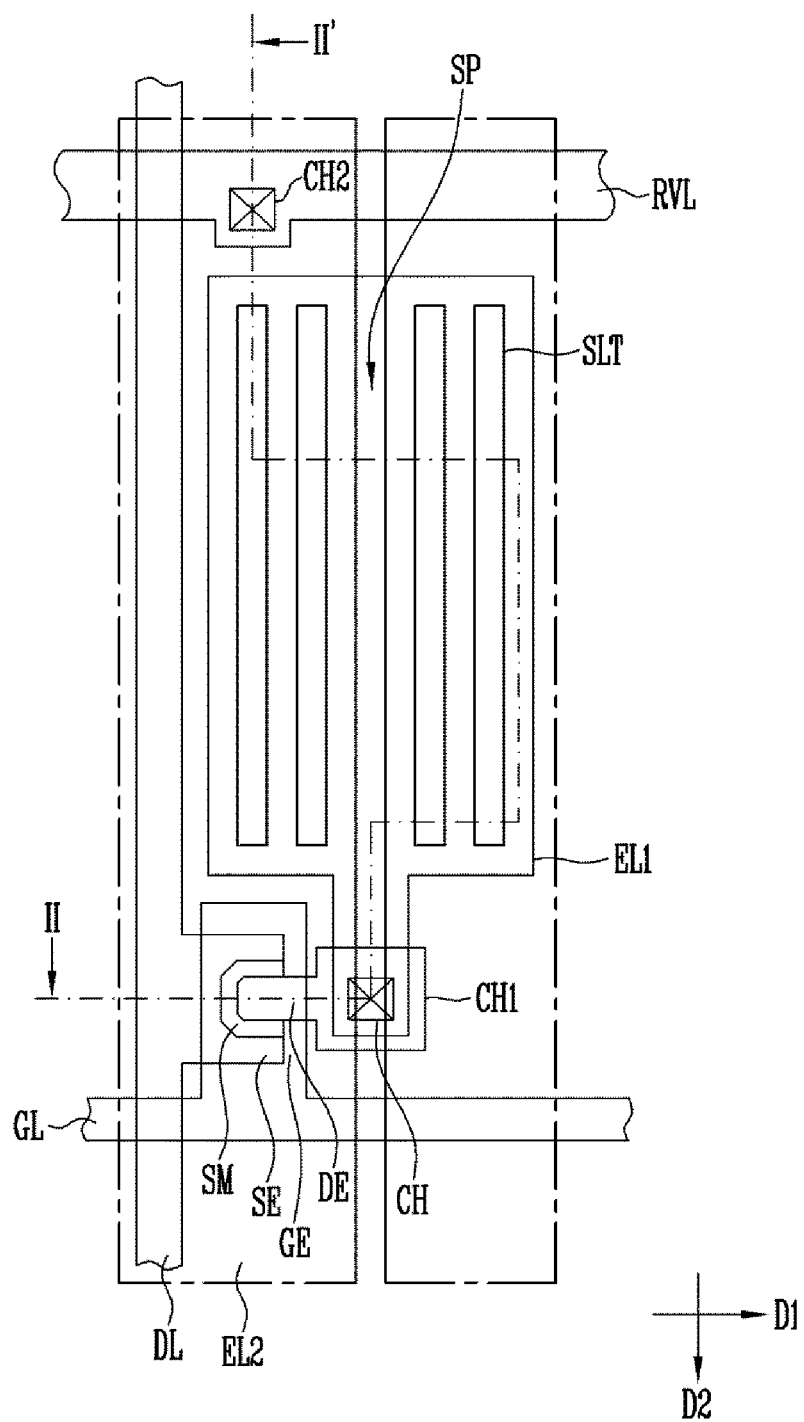
FIG. 5A is a plane view of a pixel in a display device.

In an embodiment of the present disclosure, each of the pixels capable of realizing the aforementioned embodiments may be provided in various shapes. FIG. 5A is a plane view illustrating one pixel of the display device illustrated in FIG. 4, and FIG. 5B is a cross-sectional view of FIG. 5A along line FIGS. 5A and 5B illustrate a first substrate, a second substrate, and a liquid crystal layer provided between the first substrate and the second substrate.

Figure 5B:
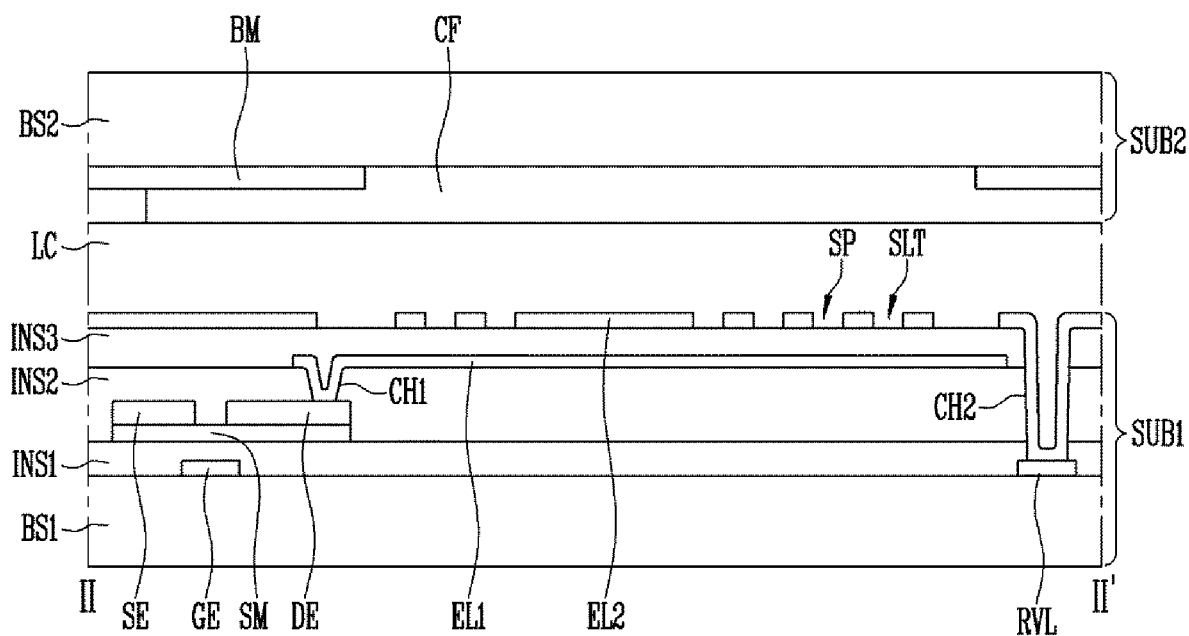
FIG. 5B is a cross-sectional view of FIG. 5A along line II-IF.

Referring to FIGS. 4, 5A, and 5B, the pixels are provided between the data lines DL arranged sequentially in the first direction D1, and between the gate lines GL adjacent to each other. In the present embodiment, FIGS. 5A and 5B illustrate one of a plurality of pixels as a representative. The rest of the pixels have substantially the same structure as the illustrated structure, and thus additional illustration is omitted. Furthermore, in the present invention, for the sake of ease of explanation, a gate line GL refers to a gate line to which one pixel is connected, and a data line DL refers to a data line to which the pixel is connected.

The display device includes a first substrate SUB1, a second substrate SUB2 facing the first substrate SUB1, and a liquid crystal layer LC formed between the first substrate SUB1 and the second substrate SUB2.

The first substrate SUB1 includes a wire portion provided on the first base substrate BS1, and a pixel connected to the wire portion. The pixel includes a thin film transistor TFT connected to the wire portion, a first electrode EL1 connected to the thin film transistor TFT, and a second electrode EL2 insulated from the first electrode EL1 by an insulating film.

The base substrate BS1 has a generally square shape made of a transparent insulating material.

The wire portion includes a gate line GL, a reference voltage line RVL, and a data line DL.

The gate line GL extends on the first base substrate BS1 in the first direction D1.

The reference voltage line RVL extends on the first base substrate BS1 in the first direction D1.

On the first base substrate BS1 where the gate line GL and the reference voltage line RVL are formed, a first insulating film INS1 is provided. The insulating film INS1 is made of an insulating material, for example, silicon nitride or silicon oxide.

The data line DL extends in the second direction D2 that crosses the first direction D1 having the first insulating film INS1 between the data line DL and the gate line GL.

The thin film transistor TFT is connected to the gate line GL and to the data line DL. Referring to FIG. 1, in the entirety of the pixels, the gate lines GL, the data lines DL, and the thin film transistors TFT are provided in the plural, and thus each thin film transistor TFT is connected a corresponding one of the plurality of gate lines GL and to a corresponding one of the plurality of data lines DL. The thin film transistor TFT includes a gate electrode GE, a semiconductor pattern SM, a source electrode SE, and a drain electrode DE.

The gate electrode GE protrudes from the gate line GL or a portion of the gate line GL forms the gate electrode GE.

The gate electrode GE may be made of metal. The gate electrode GE may be made of nickel, chromium, molybdenum, aluminum, titanium, copper, tungsten, or an alloy thereof. The gate electrode GE may be made of a single-layer metal film or a multiple-layered metal film. For example, the gate electrode GE may be a triple-layered film on which molybdenum, aluminum, and molybdenum are sequentially laminated, or a double-layered film on which titanium and copper are sequentially laminated. Otherwise, the gate electrode GE may be a single-layer film made of an alloy of titanium and copper.

The semiconductor pattern SM is provided on the first insulating film INS1. The semiconductor layer SM is provided on the gate electrode GE having the first insulating film INS1 disposed therebetween. A portion of the semiconductor pattern SM overlaps the gate electrode GE. The semiconductor pattern SM may be made of an amorphous silicon thin film or an oxide semiconductor thin film.

The source electrode SE is formed to branch off from the data line DL. The source electrode SE is formed on the semiconductor pattern SM, and a portion of the source electrode SE overlaps the gate electrode GE.

The drain electrode DE is formed to be spaced apart from the source electrode SE having the semiconductor pattern SM between the drain electrode DE and the source electrode SE. The drain electrode DE is formed on the semiconductor pattern SM, and a portion of the drain electrode DE overlaps the gate electrode GE.

The source electrode SE and the drain electrode DE may be made of nickel, chrome, molybdenum, aluminum, titanium, copper, tungsten, or an alloy thereof. The source electrode SE and the drain electrode DE may be made of a single-layer film or a multiple-layered film of the aforementioned metals. For example, the source electrode SE and the drain electrode DE may be a double-layered film on which titanium and copper are sequentially laminated. Otherwise, the source electrode SE and the drain electrode DE may be a single-layer film made of an alloy of titanium and copper.

The source electrode SE and the drain electrode DE are spaced apart from each other, and thus a top surface of the semiconductor pattern SM between the source electrode SE and the drain electrode DE is exposed. In the semiconductor pattern SM between the source electrode SE and the drain electrode DE, depending on whether or not a voltage is applied to the gate electrode GE, a conductive channel may or may not be formed between the source electrode SE and the drain electrode DE.

On the source electrode SE and the drain electrode DE, a second insulating film INS2 is provided. The second insulating film INS2 is made of an insulating material such as silicon nitride, silicon oxide, organic polymer and the like.

On the second insulating film INS2, a first contact hole CH1 is provided that exposes a portion of the top surface of the drain electrode DE.

The first electrode EL1 is provided on the second insulating film INS2, and the first electrode EL1 is connected to the drain electrode DE through the first contact hole CH1. The first electrode EL1 is made of a one-piece plate.

On the second insulating film INS2 on which the first electrode EL1 is formed, a third insulating film INS3 is provided. The third insulating film INS3 may be made of an insulating material such as silicon nitride, silicon oxide, organic polymer and the like.

The second electrode EL2 is provided on the third insulating film INS3. The second electrode EL2 overlaps the first electrode EL1, and the second electrode EL2 may have a plurality of slits SLT. In an embodiment of the present disclosure, four slits SLT are formed, and besides the four slits SLT, there is a spaced portion SP provided between two electrodes EL2 that are adjacent to each other.

In the first insulating film INS1 to the third insulating film INS3, a second contact hole CH2 is formed that exposes a portion of the top surface of the reference voltage line RVL. The second electrode EL2 is connected to the reference voltage line RVL through the second contact hole CH2. The reference voltage line RVL is provided on the non-display area. Herein, according to an embodiment of the present disclosure, there is one reference voltage line RVL that connects the second electrode EL2 to one pixel area PA, but the inventive concept is not limited thereto. A plurality of reference voltage lines RVL may be provided in one pixel area PA. That is, a plurality of reference voltage lines RVL may be provided to connect at least some of second electrodes EL2 in a same row in one pixel area PA. However, each second electrode EL2 covers pixel areas PA of numerous rows, and thus one pixel area PA need not be provided with reference voltage lines RVL that connect all the second electrodes EL2 in the same row, and the reference voltage lines RVL may be distributed to the pixel areas PA of numerous rows.

Herein, the second electrode EL2, the first electrode EL1, and the third insulating film INS3 form a storage capacitor of each pixel.

The first electrode EL1 and the second electrode EL2 are made of a transparent conductive material. The first electrode EL1 and the second electrode EL2 may be made of a transparent conductive oxide. Examples of the transparent conductive oxide include ITO Indium Tin Oxide, IZO Indium Zinc Oxide, and ITZO Indium Tin Zinc Oxide and the like.

The second substrate SUB2 is arranged opposite to the first substrate SUB1. The second substrate SUB2 may include a second base substrate BS2, a color filter CF, and a black matrix BM.

A color filter CF may represent red, green, or blue, but the inventive concept is not limited thereto, and thus the color filter CF may represent various colors such as white, yellow, cyan, magenta and the like.

The black matrix BM is formed between the color filters CF to block light penetrating the liquid crystal layer LC. In an embodiment of the present disclosure, it is illustrated that the color filter CF is provided on the second substrate SUB2, but the inventive concept is not limited thereto. In another embodiment, however, the color filter CF may be provided on the first substrate SUB1.

The liquid crystal layer LC includes a liquid crystal composition having liquid crystal molecules with characteristics of anisotropy of refractive index and anisotropy of dielectric anisotropy.

In an embodiment of the present disclosure, in a display mode, the thin film transistor TFT is turned-on in response to a gate signal being provided through the gate line GL, and a data voltage being provided through the data line DL is provided to the first electrode EL1 through the thin film transistor TFT turned-on. Accordingly, an electric field is formed between the first electrode EL1 to which the data voltage is applied and the second electrode EL2 to which a common voltage is applied. The liquid crystal molecules of the liquid crystal layer LC are driven by the electric field, and as a result, an image is displayed according to the amount of light passing through the liquid crystal layer LC.

In the present embodiment, the pixel electrode is a one-piece plate, the common electrode has slits, and the display device may be driven in a PLS Plane-to-Line Switching mode. However, there is no limitation to the shape of the pixel electrode, common electrode, or its driving mode. For example, a plurality of branches may be formed in the pixel electrode as well. In such a case, the branches of the pixel electrode may be arranged on a plane alternately with the branches of the common electrode, and may operate in an IPS In Plane Switching mode. Furthermore, the structure of the display device may have another mode besides the PLS mode and the IPS mode as long as it is not against the concept of the present disclosure.

Figure 6:
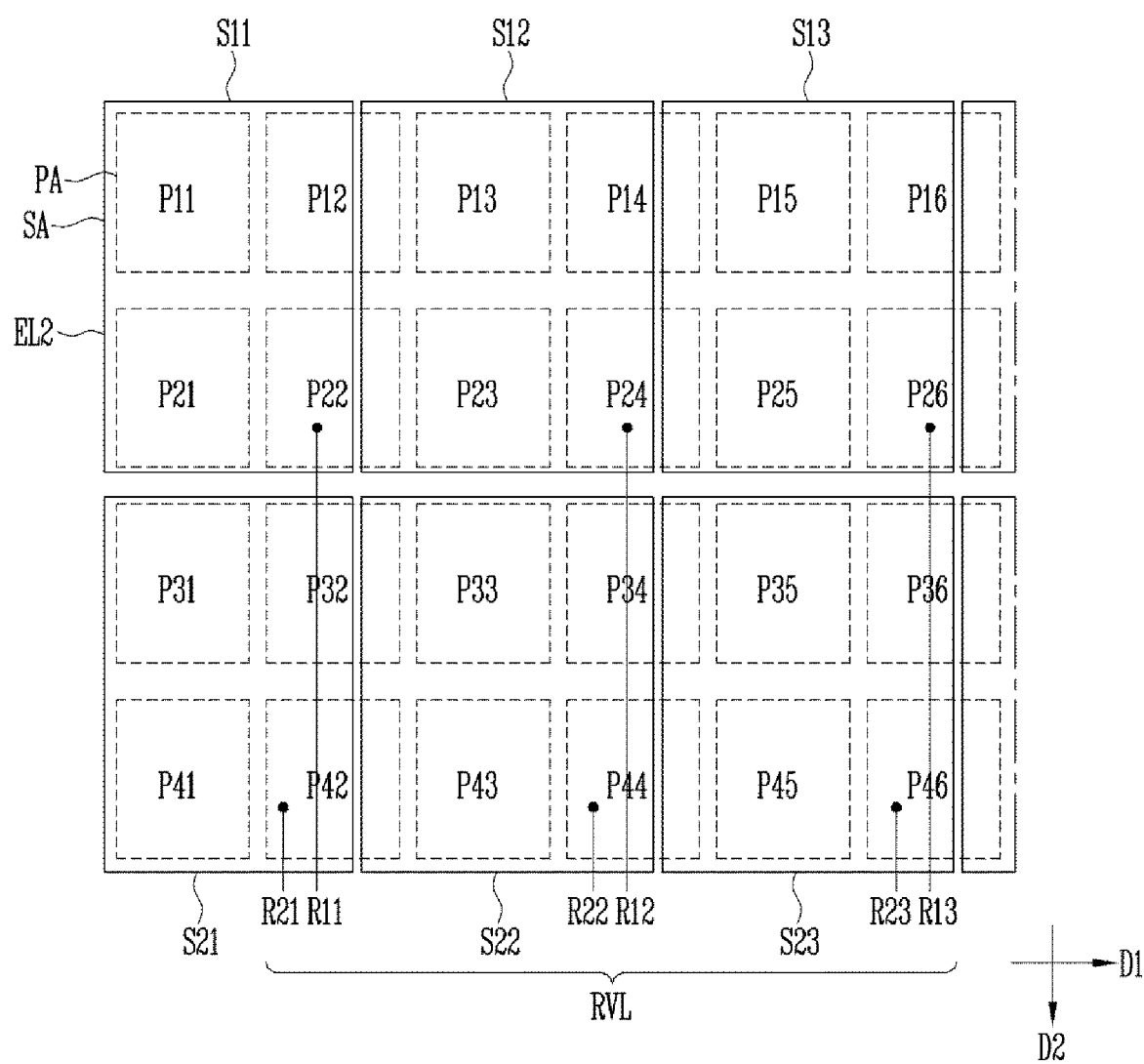
FIG. 6 is a plane view of an arrangement of second electrodes according to another embodiment of the present disclosure.

In the aforementioned embodiment, the reference voltage line RVL extends in the same direction as the gate line, but the inventive concept is not limited thereto. That is, the reference voltage line may extend in another direction. FIG. 6 is a plane view illustrating an arrangement of second electrodes according to another embodiment of the present disclosure, wherein a connection relationship with wires is illustrated when the second electrodes are used as sensing electrodes. Hereinafter, in explaining the embodiments of the present disclosure, the main focus will be on what is different from the aforementioned embodiments in order to avoid redundancy. For unexplained portions, explanation on the aforementioned will apply. Like reference numerals indicate like components.

Referring to FIG. 6, the second electrodes EL2 may be used as sensing electrodes of a self-capacitive touch sensor. In an embodiment of the present disclosure, the second electrodes EL2 are provided in each of the sensing areas SA. To each second electrode EL2, the reference voltage lines RVL each connecting the second electrodes EL2 to the touch IC TCH, see FIG. 1, are connected. One reference voltage lines RVL is provided in each sensing area.

In another embodiment of the present disclosure, the reference voltage lines RVL may extend in the second direction D2, that is, in parallel to the extension direction of the data lines DL. In a display mode, the second electrodes EL2 receives a common voltage from the common voltage generator CVG, see FIG. 1, and in a touch mode, the second electrodes EL2 receive a touch scan signal from the touch IC TCH and provide a touch sensed signal to the touch IC TCH.

Figure 7A:
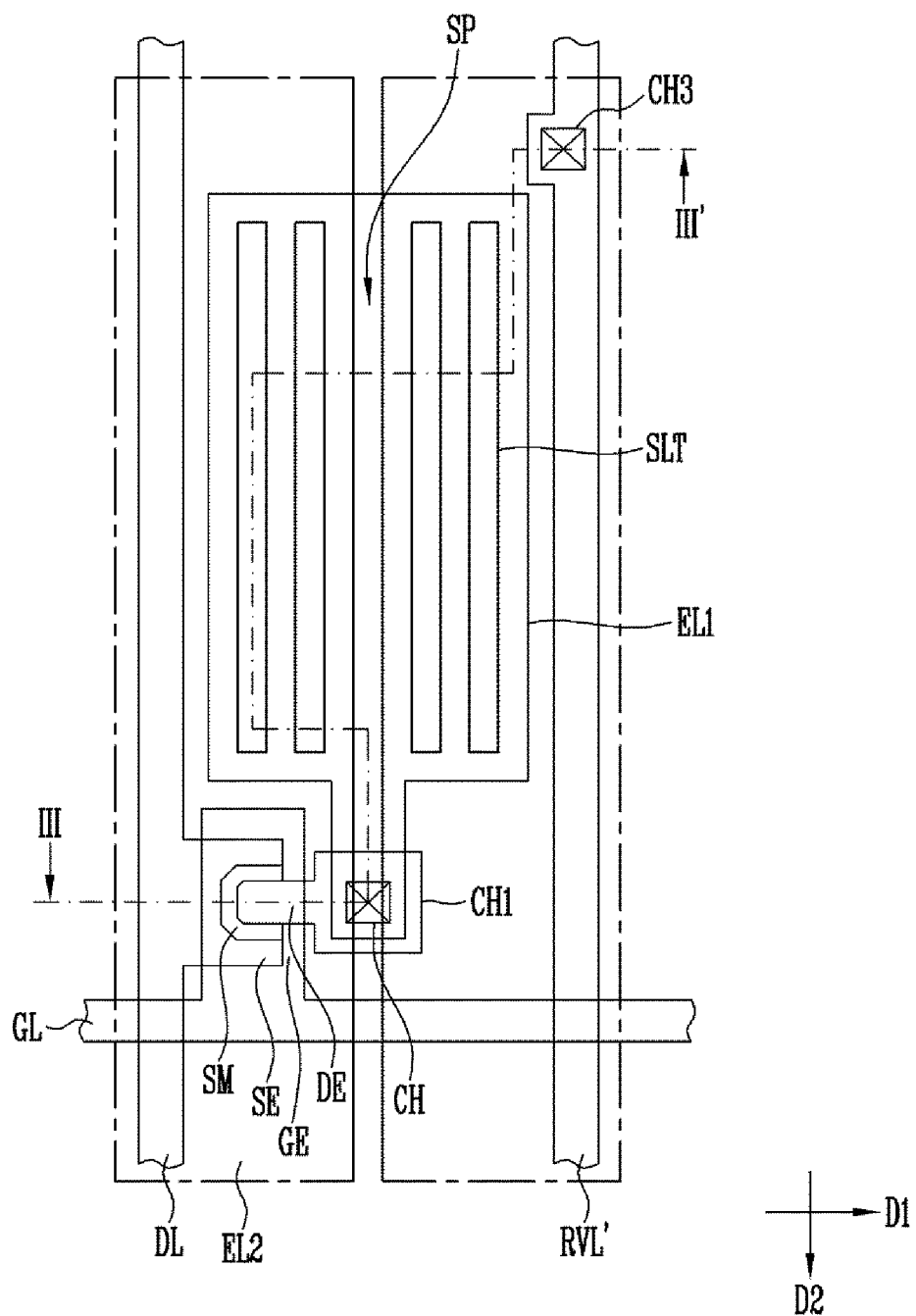
FIG. 7A is a plane view illustrating a pixel of a display device according to another embodiment of the present disclosure.
Figure 7B:
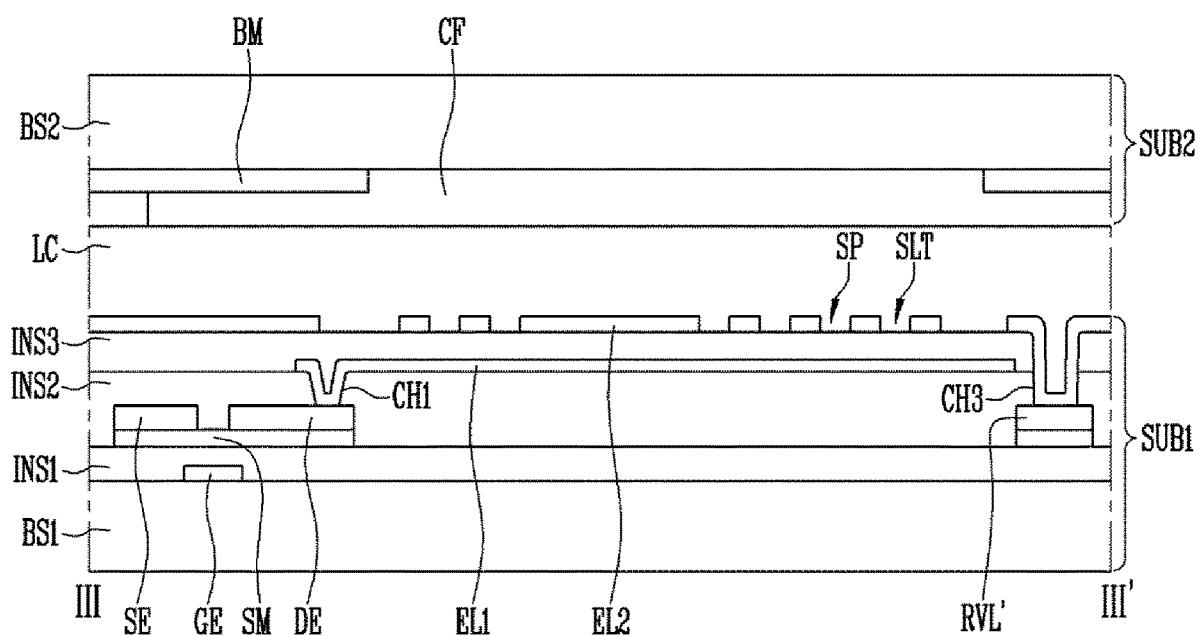
FIG. 7B is a cross-sectional view of FIG. 7A along line.

FIG. 7A is a plane view illustrating a pixel in FIG. 6, and FIG. 7B is a cross-sectional view of FIG. 7A along line III-III'. In FIG. 7A and FIG. 7B, a first substrate, a second substrate, and a liquid crystal layer provided between the first substrate and the second substrate are illustrated.

Referring to FIG. 6, FIG. 7A, and FIG. 7B, pixels are provided between data lines DL sequentially arranged in the first direction D1 and between gate lines GL adjacent to each other.

The display device includes the first substrate SUB1, the second substrate SUB2 arranged opposite to the first substrate SUB1, and the liquid crystal layer LC formed between the first substrate SUB1 and the second substrate SUB2.

The first substrate SUB1 includes a first base substrate BS1, a wire portion provided on the first base substrate BS1, and a pixel connected to the wire portion. The pixel includes a thin film transistor TFT connected to the wire portion, a first electrode EL1 connected to the thin film transistor TFT, and a second electrode EL2 insulated and spaced apart from the first electrode EL1.

The wire portion includes a gate line GL, a reference voltage line RVL', and a data line DL.

The gate line GL is formed on the first base substrate BS1 to extend in the first direction D1.

On the first base substrate BS1 on which the gate line GL is formed, the first insulating film INS1 is provided.

The data line DL is provided to extend in the second direction D2 that crosses the first direction D1 having the first insulating film INS1 between the data line DL and the first insulating film INS1.

The reference voltage line RVL' is also provided to extend in the second direction D2 having the first insulating film INS1 between the reference voltage line RVL' and the gate line GL.

The thin film transistor TFT is connected to the gate line GL and to the data line DL. Referring to FIG. 1, in an entirety of pixels PX, the gate lines GL, the data lines DL, and the thin film transistors TFT are provided in the plural, and thus each thin film transistor TFT is connected to a corresponding gate line GL of the plurality of gate lines GL and to a corresponding data line DL of the plurality of data lines DL. The thin film transistor TFT includes a gate electrode GE, a semiconductor pattern SM, a source electrode SE, and a drain electrode DE. The gate electrode GE either protrudes from the gate line GL or a portion of the gate line GL forms the gate electrode GE. The semiconductor pattern SM is provided on the first insulating film INS1. The source electrode SE is provided to branch off from the data line DL. The source electrode SE is formed on the semiconductor pattern SM, and a portion of the source electrode SE overlaps the gate electrode GE.

On the source electrode SE and the drain electrode DE, a second insulating film INS2 is provided. On the second insulating film INS2, a first contact hole CH1 that exposes a portion of the top surface of the drain electrode DE is provided.

The first electrode EL1 is provided on the second insulating film INS2, and the first electrode EL1 is connected to the drain electrode DE through the first contact hole CH1. The first electrode EL1 is made of a one-piece plate.

On the second insulating film INS2 on which the first electrode EL1 is formed, a third insulating film INS3 is formed.

The second electrode EL2 is provided on the third insulating film INS3. In the second insulating film INS2 to the third insulating film INS3, a third contact hole CH3 is formed that exposes a portion of a top surface of the reference voltage line RVL'. The second electrode EL2 is connected to the reference voltage line RVL' through the third contact hole CH3.

The reference voltage line RVL' is provided on the non-display area between pixels adjacent to each other in the second direction D2. In an embodiment of the present disclosure, there is one reference voltage line RVL' that connects the second electrode EL2 to one pixel area PA, but the inventive concept is not limited thereto. Thus, a plurality of reference voltage lines RVL' may be provided in one pixel area PA. That is, a plurality of reference voltage lines RVL' may be provided that connect at least some of the second electrodes EL2 in a same column in one pixel area. However, each second electrode EL2 covers pixel areas PA of numerous columns, and thus one pixel area PA need not be provided with reference voltage lines RVL' that connect all the second electrodes EL2 of a same column, and the reference voltage lines RVL' may be distributed to the pixel areas PA of numerous columns.

The second substrate SUB2 is arranged opposite to the first substrate SUB1. The second substrate SUB2 may include a second base substrate BS2, a color filter CF, and a black matrix BM.

The liquid crystal layer LC includes a liquid crystal composition having liquid crystal molecules with characteristics of anisotropy of refractive index and anisotropy of dielectric anisotropy.

In the aforementioned embodiments, the second electrodes are used as sensing electrodes of a self-capacitance touch sensor, but the inventive concept is not limited thereto. In another embodiment of the present disclosure, the second electrodes may be used as sensing electrodes of a mutual capacitive touch sensor.

Figure 8:
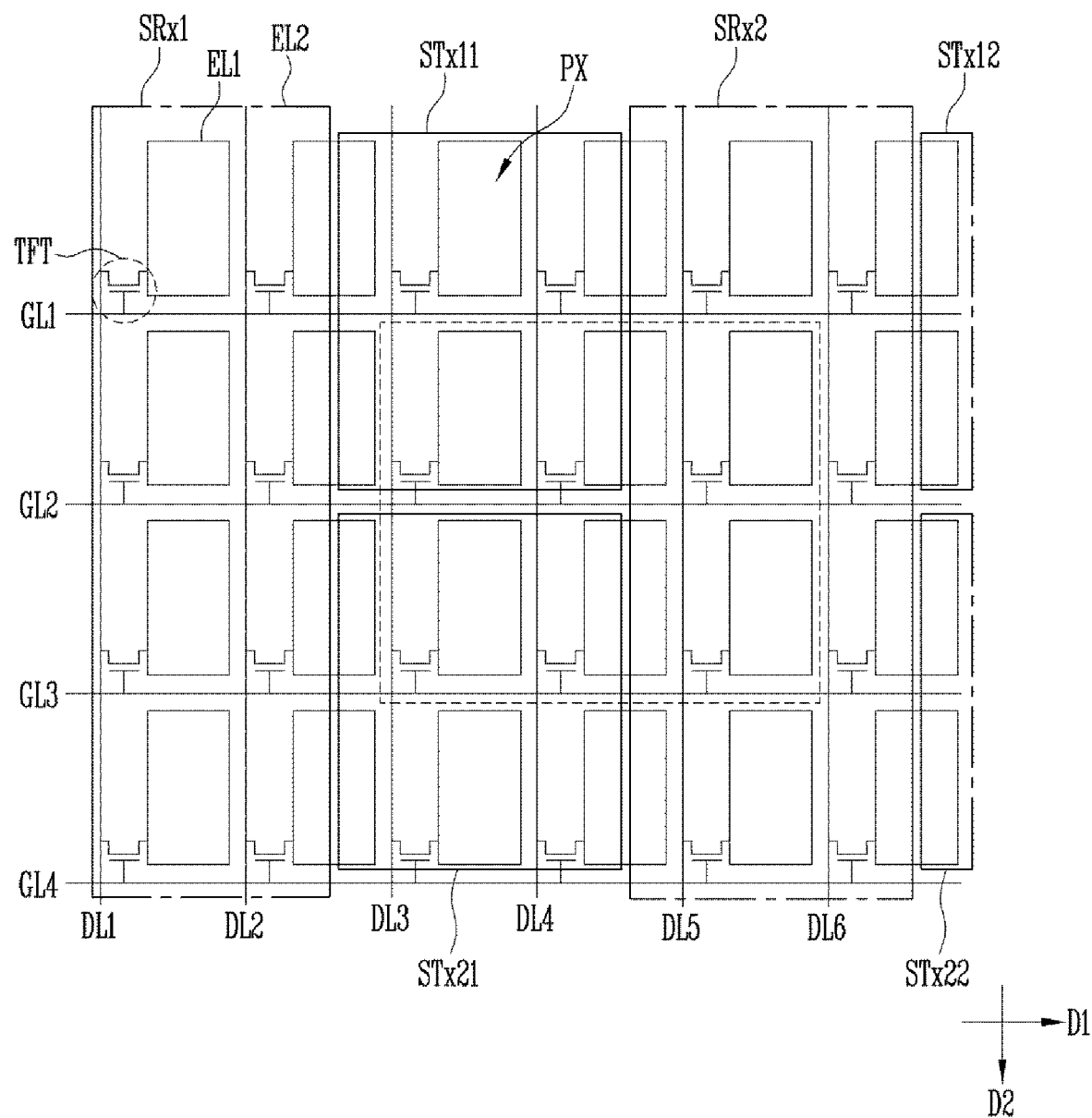
FIG. 8 is a plane view illustrating a first substrate of a display device according to another embodiment of the present disclosure.
Figure 9:
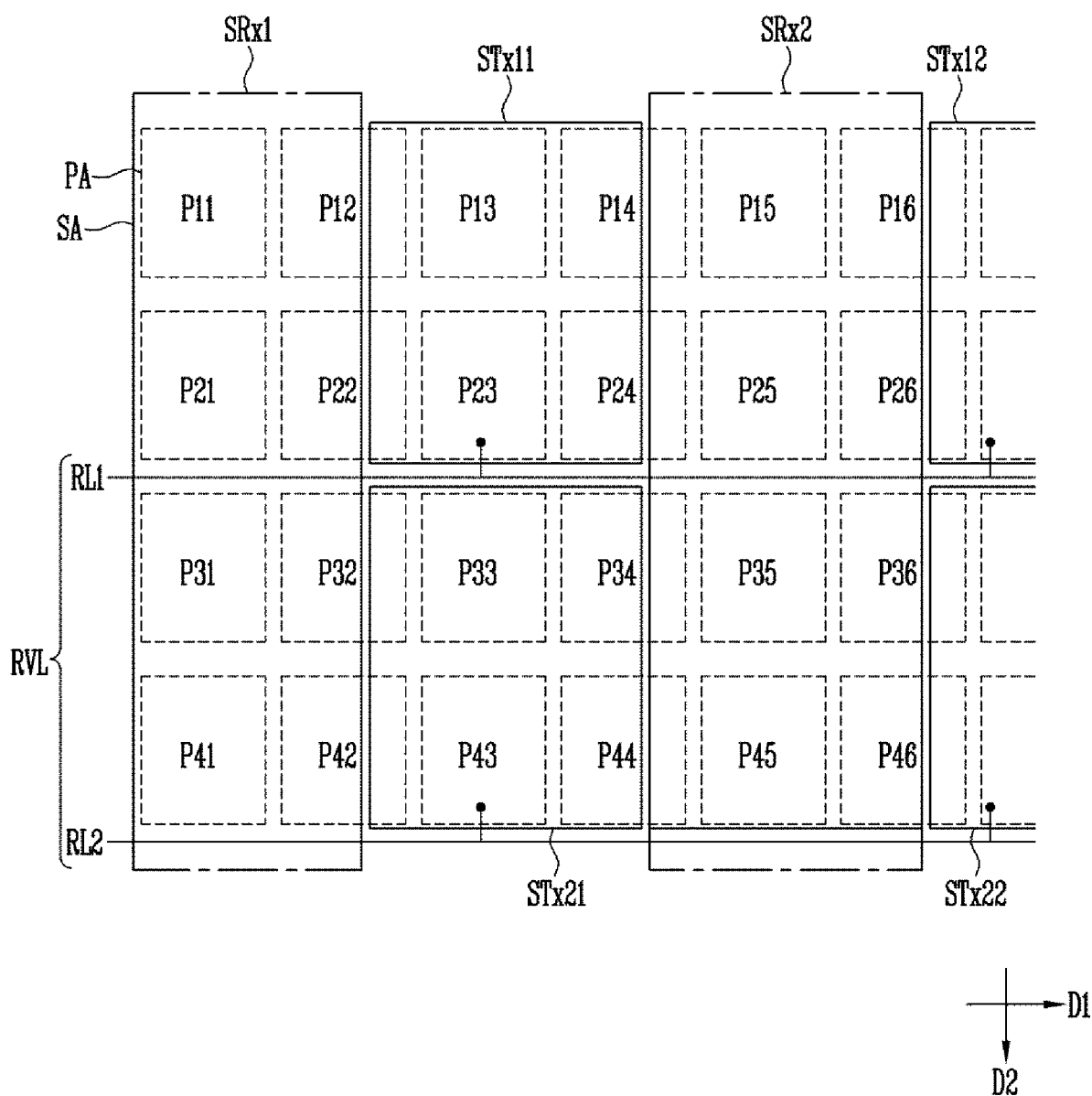
FIG. 9 is a plane view illustrating the second electrodes of FIG. 8.

FIG. 8 is a plane view illustrating a first substrate of a display device according to another embodiment of the present disclosure when the display device of the present disclosure is used as a mutual capacitive touch sensor. FIG. 9 is a plane view illustrating second electrodes in FIG. 8. FIG. 9 illustrates a connection relationship with wires when the second electrodes are used as sensing electrodes.

Referring to FIGS. 8 and 9, on the base substrate, sensing areas SA are provided. On the sensing areas SA, second electrodes EL2 of substantially the same size are provided. The sensing areas SA extend longitudinally in the second direction D2 in parallel to the data line DL, and the sensing areas SA include a plurality of receiving areas arranged in the first direction D1, and driving areas disposed therebetween. In FIG. 8 and FIG. 9, for the sake of ease of explanation, only some of the receiving areas SRx1 and SRx2; and only some of the driving areas STx11, STx12, STx21, and STx22 are illustrated.

The driving areas STx11, STx12, STx21, and STx22 are provided between adjacent receiving areas in the first direction D1. The driving areas STx11, STx12, STx21, and STx22 arranged in a same row in the first direction D1 are each electrically connected to a same reference voltage line RVL. For example, driving areas STx11, STx12, . . . provided in the first row are connected to a first reference voltage line RL1 in the first row, and driving areas STx21, STx22, . . . provided in the second row are connected to a second reference voltage line RL2 in the second row.

When referring to the second electrodes EL2 provided in the receiving areas as first sensing electrodes and the second electrodes EL2 provided in the driving areas as second sensing electrodes, the first sensing electrodes and the second sensing electrodes are arranged alternately in the first direction D1. Herein, the number of the driving areas and the number of the receiving areas may vary depending on the size and shape of the touch sensor and the display device.

The reference voltage lines RVL connected to the driving areas electrically connect the driving areas arranged in a same row to the touch IC. The touch IC TCH, see FIG. 1, applies a touch scan signal to the driving areas arranged in a same row, and receives a touch sensed signal through the first sensing electrodes while the touch scan signal is being sequentially applied to the second sensing electrodes. The touch IC TCH analyzes the received touch sensed signal and obtains whether or not a touch is made by the user and the location of the touch.

Each pixel of the display device that adopts a mutual capacitive touch sensor may be realized in a form similar to that illustrated in FIG. 5A and FIG. 5B. Referring to FIG. 5A and FIG. 5B again, since the second electrodes EL2 that correspond to the receiving areas extend longitudinally in the first direction D1 without being separated, in areas overlapping the pixel areas, there is no need for an additional wire for receiving a touch sensed signal. However, since the second electrodes EL2 that correspond to the driving areas of a same row are separated, each may be connected through the reference voltage line RVL that extends in the first direction D1. The second electrodes EL2 that correspond to the driving areas in a same row may be connected through the second contact hole CH2.

In the embodiments of the present disclosure, the shape of the first electrodes EL1 and the second electrodes EL2 may vary as long as they are within the concept of the present disclosure. Especially, the shape of the slits SLT formed inside the second electrodes EL2 may vary.

Figure 11:
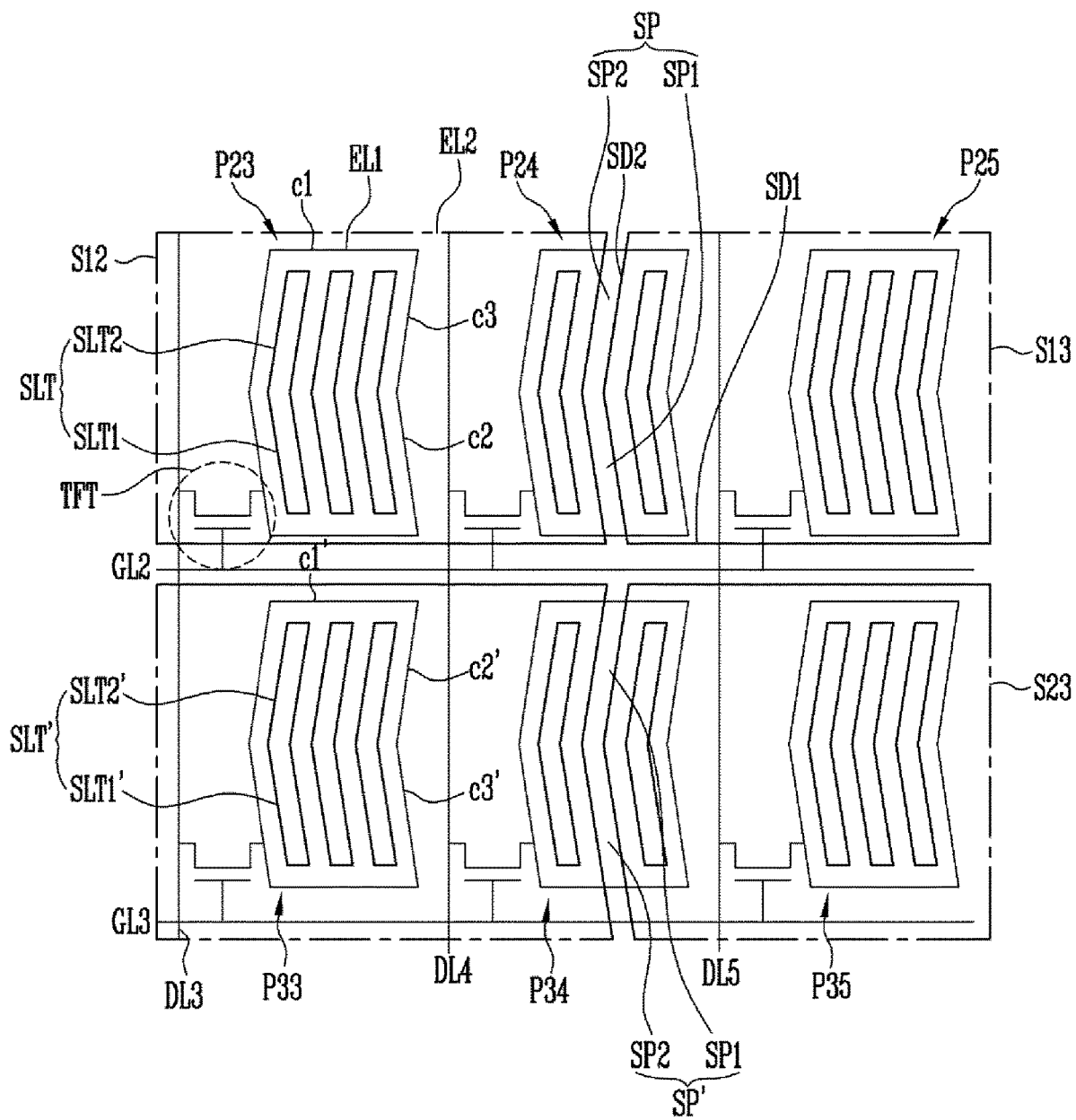
Figure 12:
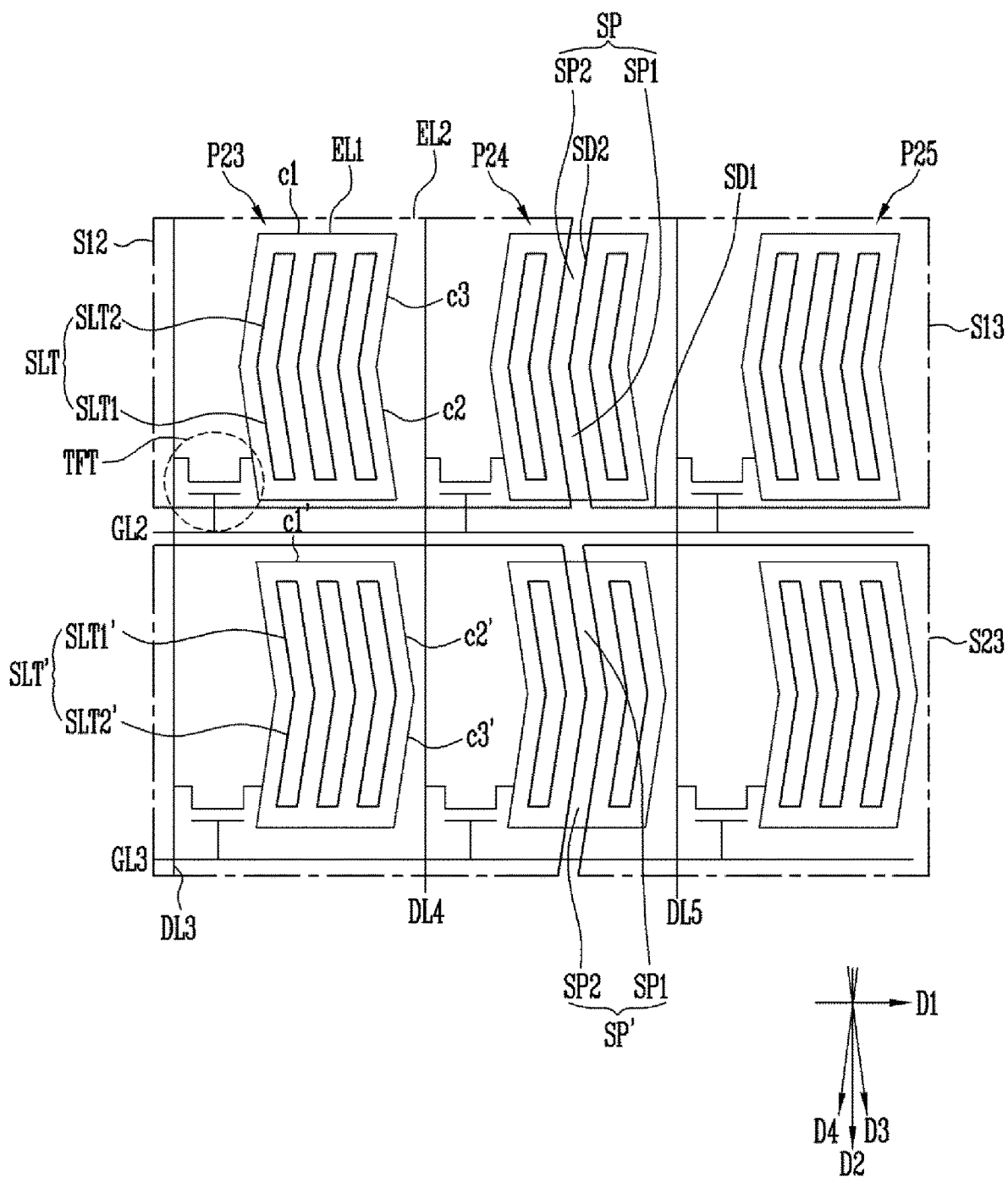

FIGS. 10 to 12 are plane views illustrating pixels according to the embodiments of the present disclosure. FIGS. 10 to 12 illustrate a portion corresponding to P1 in FIG. 2.

Referring to FIG. 10, the first electrodes EL1 arranged in each pixel area may be provided in the shape of a parallelogram. The first electrodes EL1 in adjacent rows may have a different inclination direction.

Referring to FIG. 10, when referring to the first direction D1 as the right direction, the opposite direction of the first direction D1 as the left direction, the second direction D2 as the lower direction, and the opposite direction of the second direction D2 as the upper direction, the first electrodes EL1 of the pixel areas P23, P24, P25 corresponding to an even number row may have parallelograms having upper corners that are inclined to the left. The second electrodes EL2 of the pixels areas P32, P34, P35 corresponding to an odd number row may have parallelograms having upper corners that are inclined to the right. In other words, the first electrodes EL1 corresponding to the even number row may include one pair of first sides a1 parallel to the first direction D1 and one pair of second sides a2 parallel to the third direction D3 that is inclined against the second direction D2. The first electrodes EL1 corresponding to the odd number line may include one pair of third lines a1' parallel to the first direction D1, and one pair of fourth lines a2' parallel to the fourth direction D4 inclined against the second direction D2. Herein, the third direction D3 and the fourth direction D4 are directions that cross each other and that are inclined symmetrically to each other with respect to the second direction D2.

The second electrodes EL2 arranged in each pixel area may have slits SLT having shapes that correspond to the first electrodes EL1 provided in the shape of parallelograms. For example, the second electrodes EL2 in an even number row may include first slits SLT1s that are parallel to the direction of the second sides (that is, third direction D3). The second electrodes EL2 corresponding to an odd number line may include second slits SLT2 that are parallel to the direction of the fourth lines (that is, fourth direction D4).

Herein, a spaced portion between two sides of the adjacent second electrodes EL2 facing each other, that is, a spaced portion SP may be provided to be parallel to the slits SLT. That is, the spaced portion SP corresponding to an even number row may parallel to the direction of the first slits SLT1 (the third direction D3). The spaced portion SP corresponding to an odd number row may be parallel to the extension direction of the second slits SLT2 (fourth direction D4).

In the present embodiment, the shape of the first electrodes EL1 and the shape of the second electrodes EL2 corresponding to an even number row and an odd number row may be interchangeable with each other. For example, the second electrodes EL2 may include the second slits SLT2 that are parallel to the fourth direction D4 in the pixel area corresponding to the even number row, and the first slits SLT1 that are parallel to the third direction D3 in the pixel area corresponding to the odd number row.

In the present embodiment, the first slits SLT1 and the second slits SLT2 of the second electrodes EL2 are alternately arranged in a column direction (the second direction D2). However, there is no limitation to such an arrangement of the first slits SLT1 and the second slits SLT2. Although not illustrated, in another embodiment of the present disclosure, the first slits SLT1 and the second slits SLT2 may be alternately arranged in a row direction (first direction D1). Furthermore, in another embodiment of the present disclosure, the first slits SLT1 and the second slits SLT2 may be alternately arranged in both the row direction (first direction D1) and in the column direction (second direction D2). The spaced portions SP are formed to correspond to an extending direction of the slits SLT.

Referring to FIG. 11, the first electrodes EL1 arranged in each pixel area may be provided in the shape of bent parallelograms. For example, each of the first electrodes EL1 may have a chevron shape sharing a virtual line extending in the first direction D1 as a line of symmetry. Accordingly, the first electrodes EL1 may include one pair of first sides c1 parallel to the first direction D1, one pair of second sides c2 parallel to the third direction D3, and one pair of third sides c3 parallel to the fourth direction D4.

The second electrodes EL2 arranged in each pixel area may have slits SLT in the shape corresponding to the first electrodes ELL That is, each slit SLT includes a first slit SLT1 that extends in the third direction D3, and a second slit SLT2 that extends in the fourth direction D4, and an upper end of the first slit SLT1 is connected to a lower end of the second slit SLT2. These slits SLT may also have the chevron shape sharing the virtual line as the line of symmetry.

Herein, a spaced portion between two sides of the adjacent second electrodes EL2 facing each other, that is, a spaced portion SP may be provided to be parallel to the slits SLT. That is, the spaced portion SP also have the chevron shape sharing the virtual line as the line of symmetry and includes a first spaced portion SP1 that extends in the third direction D3, and a second spaced portion SP2 that extends in the fourth direction D4, and an upper end of the first spaced portion SP1 is connected to a lower end of the second spaced portion SP2. Since the pixels are repeated per row, the spaced portions SP that are adjacent to each other in the row direction may be connected to each other. For example, a first spaced portion SP1 of a predetermined row may be connected to a second spaced portion SP2 of a previous row, and a second spaced portion SP2 of the predetermined row may be connected to a first spaced portion SP1 of a next row.

Referring to FIG. 12, the first electrodes EL1 arranged in each pixel area may have the chevron shape.

In the present embodiment, the first electrodes EL1 in an even number row may include one pair of first sides c1 parallel to the first direction D1, one pair of second sides c2 parallel to the third direction D3, and one pair of third lines c3 parallel to the fourth direction D4, and upper ends of the second sides c2 are connected to lower ends of the third sides c3. The first electrodes EL1 in an odd number row include first sides c1' parallel to the first direction D1, one pair of second sides c2' parallel to the third direction D3, and one pair of third sides c3' parallel to the fourth direction D4, but upper ends of the third sides c3' are connected to lower ends of the second sides c2'. Accordingly, the first electrodes EL1 in the even number rows and the first electrodes EL1 in the odd number rows may be in a rotational symmetry having 180° as a degree of rotational symmetry.

The second electrodes EL2 arranged in each pixel area may have slits SLT having the chevron shape which corresponds to the first electrodes EL1. That is, each slit SLT in the even number row includes a first slit SLT1 that extends in the third direction D3, and a second slit SLT2 that extends in the fourth direction D4, and an upper end of the first slit SLT1 is connected to a lower end of the second slit SLT2. Each slit SLT of the odd number row includes a first slit SLT1' that extends in the third direction D3 and a second slit SLT2' that extends in the fourth direction D4, but a lower end of the first slit SLT1' is connected to an upper end of the second slit SLT2'.

Herein, a spaced portion between two sides of the adjacent second electrodes EL2 facing each other, that is, a spaced portion SP may be provided to be parallel to the slits SLT. The spaced portion SP also includes a first spaced portion SP1 that extends in the third direction D3, and a second spaced portion SP2 that extends in the fourth direction D4, and, in each spaced portion SP in the even number row, an upper end of the first spaced portion SP1 is connected to a lower end of the second spaced portion SP2, and, in each spaced portion SP in the odd number row, a lower end of the first spaced portion SP1 is connected to an upper end of the second spaced portion SP2.

However, there is no limitation to the arrangement of second sides and third sides of the first electrodes EL1, the first slits SLT1, the second slits SLT2, and the spaced portions SP. For example, the first electrodes EL1 having the chevron shape and the first electrodes EL1 having the 180° rotational symmetry with the first electrodes EL1 having the chevron shape may be alternately arranged in the row direction, or in both the row and column directions. Correspondingly, the first slits SLT1 and the second slits SLT2 may be alternately arranged in the same manner in the row direction, or may be arranged in both the row and column directions. The spaced portions SP are formed to correspond to the arrangement of the slits SLT.

Furthermore, in the aforementioned embodiments, the slits SLT that the second electrodes EL2 have are arranged in the form corresponding to the first electrodes ELL However, there is no limitation to the arrangement of the slits SLT, and thus the slits SLT may be arranged in forms other than that of the first electrodes EL1. For example, each of the first electrodes EL1 may be provided in a rectangular shape having sides parallel to the first direction D1 and to the second direction D2, and the slits SLT formed in the second electrode EL2 may extend in the third direction D3 or in the fourth direction D4.

In the aforementioned embodiments, by providing various shapes of slits, it is possible to broaden the viewing angle and improve the recognition degree of the display device.

Figure 13:
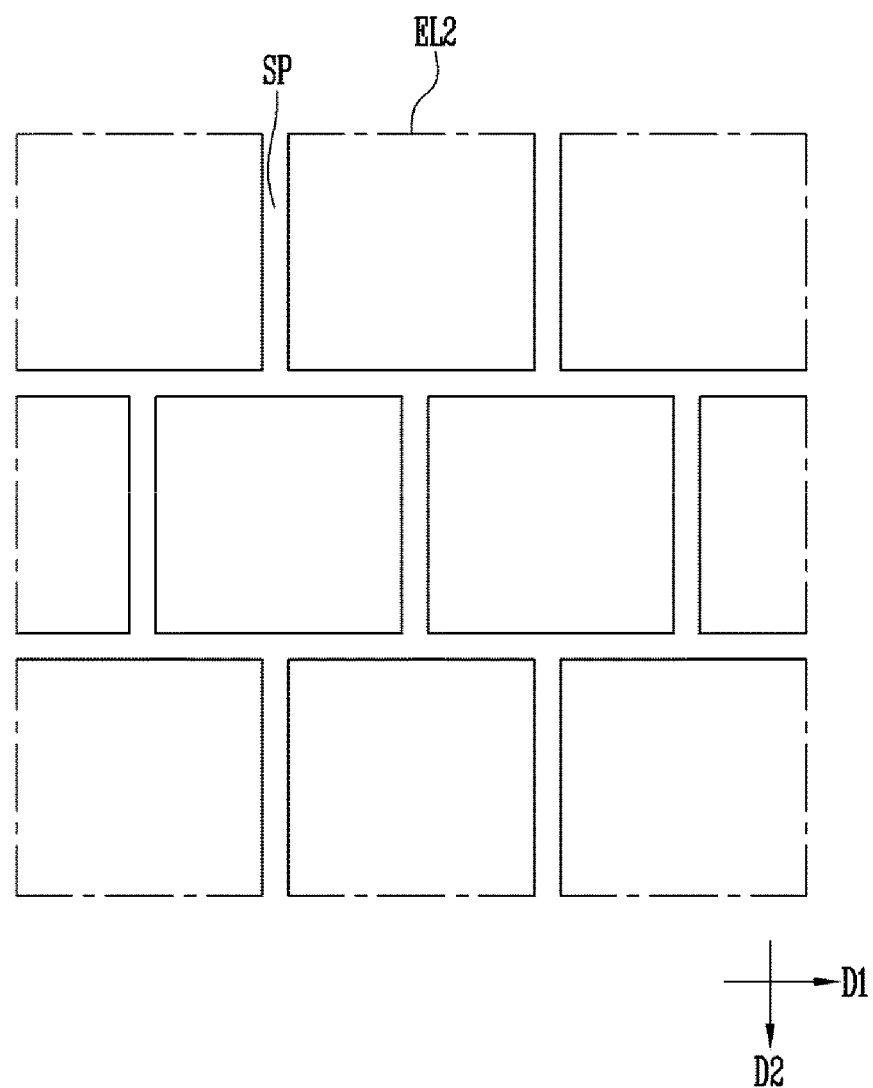
FIGS. 13 and 14 are plane views illustrating shapes of second electrodes according to the embodiments of the present disclosure.
Figure 14:
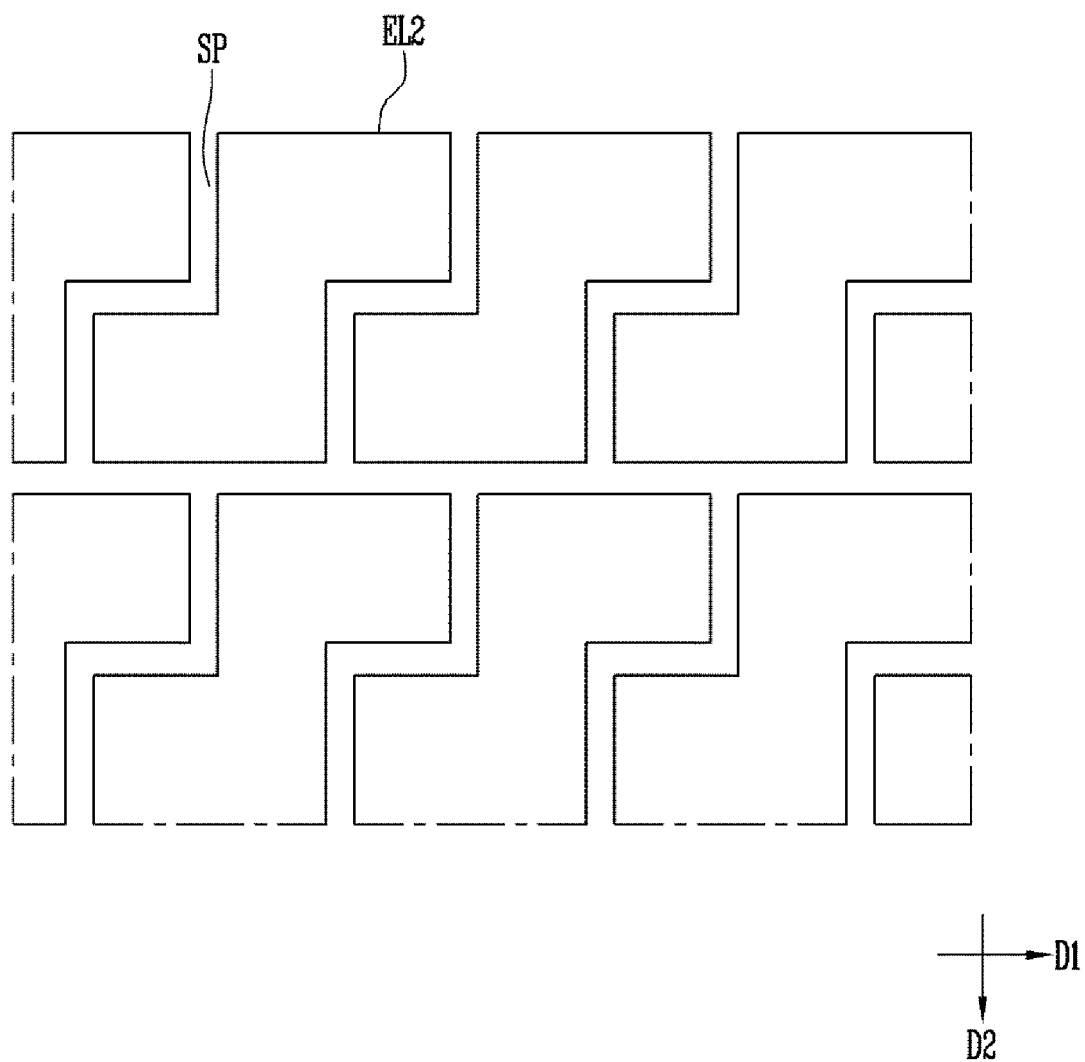

In the embodiments of the present disclosure, the shape of the second electrodes may vary as long as it is within the scope of concept of the present disclosure. FIGS. 13 and 14 are plane views illustrating shapes of the second electrodes according to embodiments of the present disclosure.

Referring to FIG. 13, the second electrodes EL2 may each be provided in a rectangular shape in a plan view. In an embodiment of the present disclosure, the second electrodes EL2 may be arranged in a zig-zag form along one direction, and thus as illustrated in FIG. 13, the second electrodes EL2 may be arranged in a zig-zag form in the second direction D2. However, in another embodiment of the present disclosure, the second electrodes EL2 may be arranged in a zig-zag form in the first direction D1. In another embodiment of the present disclosure, the second electrodes EL2 may be arranged in a zig-zag form in both the first direction D1 and the second direction D2. Accordingly, between the second electrodes EL2 that are adjacent to each other, there are spaced portions SP extending in the first direction D1 and spaced portions SP extending in the second direction, and the spaced portions SP extending in the first direction D1 may be provided on the non-display area in the first direction D1, and the spaced portions SP extending in the second direction D2 may be at least partially provided in the display area.

Referring to FIG. 14, the second electrodes EL2 may be provided in polygonal shapes in a plan view. In the present embodiment, the second electrodes EL2 may each have an octagonal shape. As the second electrodes EL2 have octagonal shapes, between the second electrodes D2 adjacent to each other, a spaced portion SP that extends in the first direction D1 and a spaced portion SP that extends in the second direction D2 may be arranged in various ways. Herein, the spaced portion SP that extends in the first direction D1 may be provided in the non-display area in the first direction D1, and the spaced portion SP that extends in the second direction D2 may be partially provided in the display area.

Although not illustrated, the second electrodes EL2 may have the shapes of which at least one side is curved. In such a case, the spaced portion SP that substantially extends in the first direction D1 may be provided in the non-display area in the first direction D1, and the spaced portion that substantially extends in the second direction D2 may be partially provided in the display area.

In the aforementioned embodiments, as the second electrodes are provided in various shapes, it is possible to identify the touch by the user more precisely.

The display device according to the aforementioned embodiments of the present disclosure provides the following effects.

In conventional display devices, a spaced portion between two sides of adjacent second electrodes facing each other, that is, a spaced portion either overlap data lines, or the spaced portion is provided on a non-display area that extends along the data lines. Accordingly, between the data line and the two electrodes adjacent to that data line, unintended parasitic capacitor may be formed, and the parasitic capacity caused by the parasitic capacitor deteriorates the display quality.

Furthermore, to the data line, a data signal is applied, and to each of the two second electrodes adjacent to the data line, a common voltage and a touch driving voltage are applied, and thus, by the two second electrodes adjacent to the data line, an abnormal electric field may be generated. The liquid crystal molecules near the data line may be affected by the abnormal electric field, thereby causing light leaks. In order to prevent such light leaks, a component that could block the electric field, for example, a block wire is needed, which is a problem.

However, in a display device according to an embodiment of the present disclosure, a portion of a spaced portion parallel to the second direction D2 is provided within the display area and forms an electric field together with slits and first electrodes, without any portion of the spaced portion overlapping data lines or being provided within a non-display area that extends along the data lines. This prevents parasitic capacitor from being formed between one data line and two second electrodes adjacent to that data line. Furthermore, since there is no portion of the two second electrodes adjacent to each other forming an electric field, there is no defect caused by light leaks, and a block wire is not necessary either. Furthermore, since a block wire is not provided in the non-display area provided along the data lines, there is more leeway to change the design of structure of the pixels.

Furthermore, according to an embodiment of the present disclosure, it is possible to form slits of the second electrodes while at the same time forming a spaced portion serving the same function as the slits, and thus it is possible to produce a high quality display device without an additional mask or a patterning process.

Example embodiments are disclosed herein. Those of ordinary skill in the art as of the filing of the present application would understand that features, characteristics, and/or elements described in connection with a particular embodiment may be used singly or in combination with features, characteristics, and/or elements described in connection with other embodiments unless otherwise specifically indicated. Those of ordinary skill in the art would also understand that various changes in form and details may be made without departing from the spirit and scope of the present system and method.

What is claimed is:

1. A display device, comprising:
   a substrate including a plurality of pixel areas, each of the plurality of pixel areas corresponding to a pixel;
   a plurality of transistors disposed on the substrate;
   a plurality of first electrodes disposed on the plurality of transistors, each of the plurality of first electrodes provided in each of the plurality of pixel areas and electrically connected to each of the plurality of transistors; and
   a plurality of second electrodes spaced apart from the plurality of first electrodes with an insulating layer therebetween, each of the plurality of second electrodes including at least one slit,
   wherein a spaced portion between at least two second electrodes adjacent to each other is located on at least one first electrode.

2. The display device of claim 1, wherein the plurality of second electrodes are used as sensing electrodes, and capacitances of the sensing electrodes are changed by a touch.

3. The display device of claim 2, wherein:
   each of the plurality of pixel areas includes a display area to display an image and a non-display area provided on at least one side of the display area, and
   the spaced portion overlaps at least one display area.

4. The display device of claim 3, wherein:
   the plurality of pixel areas are arranged in a matrix form in a first direction and a second direction crossing each other, and
   the plurality of second electrodes are arranged in a matrix form in the first direction and the second direction crossing each other.

5. The display device of claim 4, wherein the spaced portion and the at least one slit have a same width in the first direction.

6. The display device of claim 5, further comprising:
   gate lines and data lines spaced apart and intersecting each other on the substrate; and
   reference voltage lines extended in one of the first direction and the second direction, each of the reference voltage lines connected to each of the plurality of second electrodes.

7. The display device of claim 6, wherein the reference voltage lines are disposed on a same layer as the gate lines or the data lines.

8. The display device of claim 6, wherein each of the plurality of transistors is connected to a corresponding gate line of the gate lines and to a corresponding data line of the data lines.

9. The display device of claim 8, wherein each of the plurality of thin film transistors comprises:
   a gate electrode disposed on the substrate and connected to the corresponding gate line;
   a semiconductor layer disposed on the gate electrode having an interlayer insulating layer between the semiconductor layer and the gate electrode;
   a source electrode disposed on the semiconductor layer and connected to the corresponding data line; and
   a drain electrode disposed on the semiconductor layer and connected to a corresponding first electrode of the plurality of first electrodes.

10. The display device of claim 9, wherein:
    the insulating layer is disposed on the interlayer insulating layer, and
    each of the plurality of second electrodes is connected to a corresponding reference voltage line of the reference voltage lines through a contact hole provided in the insulating layer and the interlayer insulating layer.

11. The display device of claim 9, wherein each of the plurality of first electrodes is provided as a one-piece plate.

12. The display device of claim 4, wherein:
the plurality of second electrodes include first sensing electrodes extending in the second direction and second sensing electrodes arranged between adjacent first sensing electrodes, and
the first sensing electrodes and the second sensing electrodes are alternately arranged in the first direction.

13. The display device of claim 12, further comprising reference voltage lines extended in the first direction on the substrate and connected to the first sensing electrodes.

14. The display device of claim 3, wherein:
each of the plurality of first electrodes has a plurality of first branches within the display area,
each of the plurality of second electrodes has a plurality of second branches within the display area, and
the first branches and the second branches are alternately arranged.

15. The display device of claim 1, wherein the pixel is implemented in a display mode for displaying images and in a sensing mode for sensing a touch, and in the display mode, a common voltage is applied to the plurality of second electrodes, and in the sensing mode, a sensing voltage is supplied to the plurality of second electrodes.

16. The display device of claim 1, further comprising:
a base substrate opposite to the substrate; and
a liquid crystal layer disposed between the substrate and the base substrate.

17. A display device comprising:
a substrate including a plurality of pixels, each of the plurality of pixels including a pixel electrode;
a plurality of transistors disposed on the substrate, each of the plurality of transistors electrically connected to the pixel electrode; and
a plurality of sensing electrodes disposed on the plurality of transistors, each of the plurality of sensing electrodes overlapping at least one pixel electrode,
wherein a spaced portion between at least two sensing electrodes adjacent to each other is located on at least one pixel electrode, and
wherein each of the plurality of sensing electrodes includes at least one slit extended in one direction.

18. The display device of claim 17, wherein the spaced portion and the at least one slit have a same width in the one direction.

* * * * *